(12) United States Patent
Maekawa et al.

(10) Patent No.: US 6,956,568 B2
(45) Date of Patent: Oct. 18, 2005

(54) SHAPE-INTRINSIC WATERMARKS FOR 3-D SOLIDS

(75) Inventors: Takashi Maekawa, West Newton, MA (US); Nicholas M. Patrikalakis, Belmont, MA (US); Franz-Erich Wolter, Berlin (DE); Hiroshi Masuda, Chofu (JP)

(73) Assignee: Massachussetts Institute of Technology, Cambridge, MA (US)

( * ) Notice: Subject to any disclaimer, the term of this patent is extended or adjusted under 35 U.S.C. 154(b) by 660 days.

(21) Appl. No.: 10/042,636

(22) Filed: Jan. 9, 2002

(65) Prior Publication Data

US 2003/0128209 A1 Jul. 10, 2003

(51) Int. Cl.[7] ............................................... G06T 17/00
(52) U.S. Cl. ...................................... 345/420; 382/133
(58) Field of Search ................................ 345/418, 419, 345/420, 423, 424, 440, 441; 382/133, 256, 257

(56) References Cited

U.S. PATENT DOCUMENTS

| | | | | |
|---|---|---|---|---|
| 5,238,860 A | * | 8/1993 | Sawada et al. | 438/210 |
| 6,148,114 A | * | 11/2000 | Han | 382/256 |
| 6,636,623 B2 | * | 10/2003 | Nelson et al. | 382/133 |
| 2003/0031352 A1 | * | 2/2003 | Nelson et al. | 382/131 |
| 2003/0135846 A1 | * | 7/2003 | Jayaram et al. | 717/137 |

OTHER PUBLICATIONS

Abrams, S.L., et al., "The Geometric Modeling and Interrogation System Praxiteles," *Journal of Ship Production, 11*: 117–132 (1995).

Abrams, S.L., et al., "Efficient and reliable methods for rounded-interval arithmetic," *Computer–Aided Design, 30*(8): 657–665 (1998).

Asano, T., et al., "Practical Use of Bucketing Techniques in Computational Geometry." In *Computational Geometry*, G.T. Toussaint, editor (North Holland: Elsevier Science Publishers B.V.), pp. 153–195 (1985).

Benedens, O., "Geometry–Based Watermaking of 3D Models," *IEEE Computer Graphics and Applications*, 46–55 (1999, Jan./Feb.).

Borgefors, G., "Distance Transformations in Arbitrary Dimensions," *Computer Vision, Graphics, and Image Processing, 27*:321–345 (1984).

(Continued)

*Primary Examiner*—Don Wong
*Assistant Examiner*—Huedung X. Cao
(74) *Attorney, Agent, or Firm*—Hamilton, Brook, Smith & Reynolds, P.C.

(57) ABSTRACT

Umbilics of two surfaces are compared and it is determined from this comparison whether the suspect surface is a copy of the original surface based on the comparison. Comparing umbilics includes determining whether locations of the umbilics of the suspect surface match within a specified margin umbilics of the original surface, and determining whether pattern types of umbilics of the suspect surface match pattern types of corresponding umbilics of the original surface. A "weak" test may be performed, in which corresponding points on the two surfaces are compared, wherein the comparison of umbilics is performed if corresponding points of the two surfaces are located within a specified margin of each other. The points may be gridpoints on wireframes, which in turn may be based on lines of curvature of the surfaces. Comparing umbilics is performed if it is determined that each surface has at least one umbilic. Further still, an "intermediate" test may be performed which includes, for each surface, computing the principal directions of lines of curvature at each grid point. The computed directions of lines of curvature for corresponding gridpoints on the surfaces are compared. A determination is made as to whether the suspect surface is a copy of the original surface, based on the comparison.

68 Claims, 21 Drawing Sheets

OTHER PUBLICATIONS

Cormen, T.H., "Sorting in Linear Time." In *Introduction to Algorithms*, MIT Press, (NY: McGraw Hill), pp. 180–184 (1990).

Crandall, S.H., et al., "Dynamical Properties of a Rigid Body." In *Dynamics of Mechanical and Electromechanical Systems*, Stephen H. Crandall, editor (NY: McGraw-Hill Inc.), pp. 170–175 (1968).

Fornaro, C., and Sanna, A., "Public key watermarking for authentication of CSG models," *Computer–Aided Design, 32*: 727–735 (2000).

Hilbert, D., and Cohn–Vossen, S., "Ansch Au Liche Geometrie" ["Geometry and the Imagination"], (NY: Chelsea Publishing Company), pp. 202–203 (1952).

Hu, C.-Y., "Towards Robust Interval Solid Modeling of Curved Objects." Unpublished PhD thesis, Massachusetts Institute of Technology, Cambridge, MA. (1995).

Hu, Chun–Yi, et al., "Robust interval algorithm for surface intersections," *Computer–Aided Design, 29*(9): 617–627 (1997).

Hu, Chun–Yi, et al., "Robust interval algorithm for curve intersections," *Computer–Aided Design, 28*(6/7): 495–506 (1996).

Kanai, S., et al., "Digital Watermarking for 3D Polygons using Multiresolution Wavelet Decomposition." In *Proceedings of the Sixth IFIP WG5. 2/GI International Workshop on Geometric Modelling: Fundamentals and Applications* (Tokyo), pp. 296–307 (1998).

Maekawa, T., "Robust Computational Methods for Shape Interrogation." Unpublished PhD thesis, Massachusetts Institute of Technology, Cambridge, MA. (1993).

Maekawa, T. and Patrikalakis, N.M., "Computation of singularities and intersections of offsets of planar curvers," *Computer Aided Geometric Design, 10*: 407–429 (1993).

Maekawa, T., and Patrikalakis, N.M., "Interrogation of differential geometry properties for design and manufacture," *The Visual Computer, 10*: 216–237 (1994).

Maekawa, T., et al., "Umbilics and lines of curvature for shape interrogation," *Computer Aided Geometric Design, 13*: 133–161 (1996).

Mortenson, M.E., *Geometric Modeling*, (NY: John Wiley & Sons) (1985).

Ohbuchi, R., et al., "Watermarking Three–Dimensional Polygonal Models Through Geometric and Topological Modifications," *IEEE Journal on Selected Areas in Communications, 16*(4): 551–560 (1998).

Ohbuchi, R., et al., "A Shape–Preserving Data Embedding Algorithm for NURBD Curves and Surfaces." In *Proceedings of Computer Graphics International, CGI '99*, pp. 180–187 (1999).

Patrikalakis, N.M., and Bardis, L., "Localization of Rational B–Spline Surfaces," *Engineering with Computers, 7*: 237–252 (1991).

Pegna, J. and Wolter, F.–E., "Surface Curve Design by Orthogonal Projection of Space Curves Onto Free–Form Surfaces," *Journal of Medical Design, 118*: 45–52 (1996).

Praun, E., et al., "Robust Mesh Watermarking," *Computer Graphics Proceedings, Annual Conference Series*, 49–56 (1999).

Sherbrooke, E.C., and Patrikalakis, N.M., "Computation of the solutions of nonlinear polynomial systems," *Computer Aided Geometric Design, 10*: 379–405 (1993).

Yeo, B.–L., and Yeung, M.M., "watermarking 3D Objects for Verification," *IEEE Computer Graphics and Applications*, pp. 36–45 (1999, Jan./Feb.).

Zhou, J., et al., "Computation of Stationary Points of Distance Fuctions," *Engineering with Computers, 9*: 231–246 (1993).

* cited by examiner

SHAPE-INTRINSIC WATERMARKS FOR 3-D SOLIDS

RELATED APPLICATION(S)

This application is a continuation of a U.S. application Ser. No. 10/040,960 filed Jan. 7, 2002, entitled "SHAPE-INTRINSIC WATERMARKS FOR 3-D SOLIDS", by Takashi Maekawa, Nicholas M. Patrikalakis, Franz-Erich Wolter and Hiroshi Masuda.

The entire teachings of the above application are incorporated herein by reference.

GOVERNMENT SUPPORT

The invention was supported, in whole or in part, by a grant DMI-0010127 from the National Science Foundation. The Government has certain rights in the invention.

BACKGROUND OF THE INVENTION

As the information age has rapidly progressed, the relative contributions of different components defining our economies have also changed. For example, in our modern society, economic value creation is no longer created only by the fabrication of physical objects, but is created also within the context of information exchange. An essential initial part of the effort needed to fabricate physical objects lies in such creation of 3D model descriptions of the objects.

In the past, such 3D solid model descriptions had been presented with a fairly restrictive shape variety, e.g., 2D drawings such as blueprints. Today, these 3D solid objects and surfaces are typically described with computer-aided design (CAD) systems using digital data sets. Here, the richest shape variety can be described using free-form boundary surfaces that are typically defined by Non-Uniform Rational B-Spline (NURBS) surface patches.

Consequently, the most important and fundamental part of the value creation process for a 3D object consists in creating the digital 3D solid model bounded by free form surfaces. As this digital data model is an expensive and important part of the production process, there exists the natural need to protect the ownership of this data model.

Digital data models describing solid objects are often accessible to various parties. This occurs, for example, when the detailed design specifications are shown to prospective buyers of a physical copy of the solid object. Furthermore, the digital model data could be known to another party, e.g., a subcontractor or by industrial espionage, e.g., when data are communicated via the internet. It is also possible that a party could approximate digital model data by reconstructing the geometric model by reverse engineering a single physical prototype. In other instances, there could be a need for several engineers working together to simultaneously access a design database and to make changes in the database that are instantly accessible by others on the team. At the same time, there is a need for conveying these data to designers at remote locations while providing a high level of security on proprietary designs.

When proprietary digital content is exposed to the internet, it can become an easy target for malicious parties who wish to reproduce unauthorized copies. In addition, a model could be stolen or sized up for comparison direct from a file, or even by measuring and entering data points or by laser scanning a real solid.

For this reason, digital watermarking, a process in which special data, i.e., a "digital watermark," is embedded into digital content to assist in identifying ownership of the content, has become an active research topic.

Digital watermarks can be classified by visibility, i.e., visible watermarks and invisible watermarks. A visible watermark involves embedding a watermark, which is recognizable by the user, into the proprietary digital content to prevent piracy by a third party. On the other hand, an invisible watermark is not recognizable by the user, unless it is extracted by a computer program.

Several studies on digital watermarking techniques for 3D polygonal models have been prompted by the increasing popularity of virtual reality modeling language (VRML) and the imminent standardization of MPEG-4 [19, 13, 23, 4, 25]. However, existing watermarking techniques, such as embedding data by slightly changing the control points, or placing a pattern into the mesh, are vulnerable to coordinate transformation, random noise and malicious action by a user.

Moreover, these techniques cannot be applied directly to computer-aided design (CAD) based objects, which are usually represented by Non-Uniform Rational B-Spline (NURBS) surfaces. NURBS representation provides the richest shape variety for objects bounded by free-form surfaces. Creation of such 3D models is an expensive and important part of the whole production process, and there exists the natural need to protect the ownership of this data model.

Review of Related Work

Digital Watermarking on 3D Polygonal Models

Watermarking on 3D polygonal models is useful for protecting Virtual Reality Modeling Language (VRML) models. Almost all methods are designed for triangle meshes, and embed information by perturbing vertex coordinates, or changing topological connectivity.

Ohbuchi et al. [19] proposed pioneer watermarking methods for both coordinates and connectivity. In one method, one or more bits of data are embedded in a triangle by slightly altering the ratio of two edges of the triangle or its angle. It is invariant to rigid transformation and uniform scaling. Watermark bits are sequentially embedded in triangles ordered according to spanning trees. A second method uses the ratio of tetrahedra volumes, which are invariant to affine transformation. Tetrahedra are defined by three vertices of a base triangle and a common apex vertex. Watermark information is embedded by altering the ratios of volumes using coordinate perturbation. In addition, Ohbuchi et al. proposed other methods that embed information by changing topological connectivity. One method embeds visible patterns on a surface by subdividing triangle meshes. Another method embeds 0/1 patterns by modifying the connectivity of triangle strips.

Yeo and Yeung [25] proposed a fragile watermarking method that detects unauthorized alterations of 3D models. In this method, vertex coordinates are slightly altered such that the hash function of each vertex coordinates matches another hash function applied to the center of its neighboring vertices. When a 3D model is altered without authorization, its watermark information is destroyed and alteration is detected.

Benedens [4] proposed a method that embeds information in surface normal distribution. In this method, surface normals are mapped on a unit sphere, and groups of similar normals are altered in order to embed watermarking information. This method resists mesh modification, such as polygonal simplification, if the original model has dense meshes.

Kanai et al. [13] proposed a spread-spectrum watermarking method for 3D polygonal models, by embedding watermark information in the frequency domain of 3D models. This method is based on wavelet transformations and multiresolution representations that represent a 3D model as a simple base mesh with wavelet coefficients on each level of detail. The watermark information is embedded in the large wavelet coefficient vectors at one or more resolution levels of detail. The robustness of the watermark can be controlled by the level in which watermark information is embedded. This method can resist affine transformation and polygonal simplification.

Praun et al. [23] enhanced approaches of Kanai et al [13] and Benedens [4]. They constructed scalar basis functions over the mesh vertices using multiresolution analysis, and perturbed vertex coordinates along the direction of the surface normal weighted by the basis functions. In addition, they proposed mesh optimization technique for detecting watermark information in attacked meshes.

Digital Watermarking on Constructive Solid Geometry (CSG) Models

Fornaro and Sanna [8] have developed a public watermarking technique for authentication of CSG models. They considered two places in which to embed the watermark, namely solids and comments. In order to store watermark within a solid, they defined a new kind of node linked to the original CSG tree. To keep the watermark invisible, they used null volume objects, e.g., a sphere with a null radius. However, this technique is fragile to malicious action of the user.

Digital Watermarking on 3D Non-Uniform Rational B-Spline (NURBS) Surfaces

NURBS surfaces are very popular in engineering CAD, but there are few watermarking methods for NURBS models.

Ohbuchi et al. [20] proposed a data embedding algorithm for NURBS curves and surfaces, which employed rational linear parameterization for encoding watermark information. Since this method uses redundancy of re-parameterization, it preserves the exact geometric shape of NURBS curves and surfaces. Their method is simple and useful, but such watermark information can be easily removed, for example via approximation, without degrading the quality of the surfaces.

Summary Critique of State-of-the-art Methods

The use of commercial 3D CAD systems and collaboration via the Internet are becoming very common in the engineering field. As a result, protection of proprietary CAD data has become an important issue. As described above, several methods have been proposed for watermarking 3D polygonal models, especially triangular meshes. Although their methods are useful for Virtual Reality Modeling Language (VRML) models, they are inadequate for engineering use, because 3D CAD models are commonly designed using free-form curves and surfaces.

We are aware of only one method that has been proposed for watermarking of NURBS surfaces, namely Ohbuchi et al. [20], discussed above.

Currently, no robust watermarking methods exist for NURBS surfaces. Thus, proprietary engineering 3D CAD data that, for example, are transferred via the Internet, cannot be effectively protected.

References

The following references, cited within the text, are incorporated by reference herein in their entireties.

[1] S. L. Abrams, L. Bardis, C. Chryssostomidis, N. M. Patrikalakis, S. T. Tuohy, F. -E. Wolter, and J. Zhou. The geometric modeling and interrogation system Praxiteles. Journal of Ship Production, 11(2):117–132, May 1995.

[2] S. L. Abrams, W. Cho, C. -Y. Hu, T. Maekawa, N. M. Patrikalakis, E. C. Sherbrooke, and X. Ye. Efficient and reliable methods for rounded-interval arithmetic. Computer-Aided Design, 30(8):657–665, July 1998.

[3] T. Asano, M. Edahiro, H. Imai, M. Iri, and K. Murota. Practical use of bucketing techniques in computational geometry. In G. T. Toussaint, editor, Computational Geometry, Machine Intelligence and Pattern Recognition Vol. 2, pages 153–195. North Holland, 1985.

[4] O. Benedens. Geometry-based watermarking of 3D models. IEEE Computer Graphics and Applications, 19(1):46–55, 1999.

[5] G. Borgefors. Distance transformations in arbitrary dimensions. Computer Vision, Graphics, and Image Processing, 27:321–345, 1984.

[6] T. H. Cormen, C. E. Leiserson, and R. L. Rivest. Introduction to Algorithms. MIT Press, Cambridge, Mass., 1990.

[7] S. Crandall, D. Karnopp, E. Kurtz, and D. P. Brown. Dynamics of Mechanical and Electromechanical Systems. McGraw-Hill, 1968.

[8] C. Fornaro and A. Sanna. Public key watermarking for authentication of CSG models. Computer Aided Design, 32(12):727–735, 2000.

[9] D. Hilbert and S. Cohn-Vossen. Geometry and the Imagination. Chelsea, N.Y., 1952.

[10] C. -Y. Hu. Towards Robust Interval Solid Modeling for Curved Objects. PhD thesis, Massachusetts Institute of Technology, Cambridge, Mass., May 1995.

[11] C. Y. Hu, T. Maekawa, N. M. Patrikalakis, and X. Ye. Robust interval algorithm for surface intersections. Computer-Aided Design, 29(9):617–627, September 1997.

[12] C. Y. Hu, T. Maekawa, E. C. Sherbrooke, and N. M. Patrikalakis. Robust interval algorithm for curve intersections. Computer-Aided Design, 28(6/7):495–506, June/July 1996.

[13] S. Kanai, H. Date, and T. Kishinami. Digital watermarking for 3D polygons using multiresolution wavelet decomposition. In Proceedings of the Sixth IFIP WG 5. 2/GI International Workshop on Geometric Modelling: Fundamentals and Applications, Tokyo, December, 1998, pages 296–307, 1998.

[14] T. Maekawa. Robust Computational Methods for Shape Interrogation. PhD thesis, Massachusetts Institute of Technology, Cambridge, Mass., June 1993.

[15] T. Maekawa and N. M. Patrikalakis. Computation of singularities and intersections of offsets of planar curves. Computer Aided Geometric Design, 10(5):407–429, October 1993.

[16] T. Maekawa and N. M. Patrikalakis. Interrogation of differential geometry properties for design and manufacture. The Visual Computer, 10(4):216–237, March 1994.

[17] T. Maekawa, F. -E. Wolter, and N. M. Patrikalakis. Umbilics and lines of curvature for shape interrogation. Computer Aided Geometric Design, 13(2):133–161, March 1996.

[18] M. E. Mortenson. Geometric Modeling. John Wiley and Sons, New York, 1985.

[19] R. Ohbuchi, H. Masuda, and M. Aono. Watermarking three-dimensional polygonal models through geometric and topological modifications. IEEE Journal on Selected Areas in Communications, 16(14):551–560, May 1998.

[20] R. Ohbuchi, H. Masuda, and M. Aono. A shape-preserving data embedding algorithm for NURBS curves and surfaces. In Proceedings of Computer Graphics International, CGI '99, June 1999, pages 180–187. IEEE Computer Society, 1999.

[21] N. M. Patrikalakis and L. Bardis. Localization of rational B-spline surfaces. Engineering with Computers, 7(4):237–252, 1991.

[22] J. Pegna and F. -E. Wolter. Surface curve design by orthogonal projection of space curves onto free-form surfaces. Journal of Mechanical Design, ASME Transactions, 118(1):45–52, March 1996.

[23] E. Praun, H. Hoppe, and A. Finkelstein. Robust mesh watermarking. In Proceedings of SIGGRAPH '99, Los Angeles, Aug. 8–13, 1999, pages 49–56. ACM, 1999.

[24] E. C. Sherbrooke and N. M. Patrikalakis. Computation of the solutions of nonlinear polynomial systems. Computer Aided Geometric Design, 10(5):379–405, October 1993.

[25] B. L. Yeo and M. M. Yeung. Watermarking 3D objects for verification. IEEE Computer Graphics and Applications, 19(1):36–45, 1999.

[26] J. Zhou, E. C. Sherbrooke, and N. M. Patrikalakis. Computation of stationary points of distance functions. Engineering with Computers, 9(4):231–246, Winter 1993.

SUMMARY OF THE INVENTION

It would be desirable to develop methods for deciding whether two surfaces match within a certain accuracy, regardless of the particular representations used. Hence, the present invention checks approximate shape equality for surfaces regardless of their given representation, scaling and positioning in space. If a surface's shape is proprietary, we certainly must be able to decide if a given solid shape could be called rightly an approximate shape copy of another solid shape.

The present invention provides an intrinsic watermark technique for solids bounded by NURBS surfaces. Intrinsic properties of solids or surfaces are identified that are not affected by coordinate transformations, random noise and/or malicious action by a user. Such watermarks are destroyed only if the digital model describing the shape is changed so much that the newly represented object can no longer be considered to be approximately identical to the original object.

Computational methods have been and continue to be developed that allow the verification as to whether a suspect surface B is located within an $\epsilon$-offset of an original surface A. We assume that the surface model B is topologically equivalent to surface A. We compute inertia tensors of A and B, and then match A and B using translation, rotation and scaling (leading to B'). We then check whether the set of points of surface A have a distance less than $\epsilon$ to surface B'. We refer to this test as a weak condition test.

In a more stringent "intermediate" condition test, the principal directions are calculated at grid points of the mesh of lines of curvature for original surface A. The grid points are projected onto surface B', and principal directions are estimated at the projected grid points. The principal directions calculated for A are then compared with the estimated principal directions of B'.

In many instances, it is possible to go one step further still, to test a stronger condition, which, like the intermediate test, relies on the intrinsic surface properties of the bounding surfaces, in particular, by comparing locations and patterns of corresponding umbilical points on the two surfaces.

The proposed method will be useful to help protect ownership of expensive digital data models of an original solid model when it is officially registered with an acknowledged agency. Hence, with the present invention, one would be in the position to settle legal disputes in some cases that appear to be beyond the scope of currently available methods and systems.

In accordance with an embodiment of the present invention, a method for determining whether a suspect 3-D surface has been copied from an original 3-D surface includes comparing umbilics of the two surfaces and determining whether the suspect surface is a copy of the original surface based on the comparison. The term "original" is used to designate the surface to which the suspect surface is compared. It may designate a true original, or alternatively a copy or duplicate of an original model or surface.

Comparing umbilics may include determining whether locations of the umbilics of the suspect surface match within a specified margin umbilics of the original surface, and determining whether pattern types of umbilics of the suspect surface match pattern types of corresponding umbilics of the original surface.

One or both of the surfaces, i.e, the suspect surface or the original surface to which it is being compared, may be manipulated so that characteristics of the two surfaces approximately match. This manipulation may include any or all of translating, rotating or scaling.

Furthermore, a "weak" test may be performed, in which corresponding points on the two surfaces are compared, wherein the comparison of umbilics, i.e., the "strong" test, is only performed if corresponding points of the two surfaces are located within a specified margin of each other. Alternatively, the strong test is performed based on statistics generated by the weak test. Alternatively, the weak test may be repeated iteratively using a different margin of error which, for example, increases with each iteration, until some maximum error margin is reached.

Further still, an "intermediate" test may be performed which includes, for each surface, computing the principal directions of lines of curvature at each grid point. The computed directions of lines of curvature for corresponding gridpoints on the surfaces are compared. A determination is made as to whether the suspect surface is a copy of the original surface, based on the comparison. In one embodiment, the intermediate test is performed if surfaces pass the weak test, or alternatively, based on the statistics generated by the weak test. Similarly, the strong test is performed, assuming both surfaces have umbilics, if the surfaces pass the intermediate test, or alternatively, based on statistics generated by either or both of the weak and intermediate tests.

The surfaces may be closed, thus forming a 3-D solid, or they may be bordered.

One or both of the surfaces may be represented using parametric or implicit modeling, such as non-uniform rational B-splines (NURBS), or using polygons or an alternate modeling method. The two surfaces can use different modeling techniques, since the method of the present invention depends only on the shape of the surfaces and not the models used to represent them.

In a another embodiment, a registry of 3-D shapes may be maintained to be used in comparisons with the suspect surface. The registered or maintained shapes may be indexed according to umbilic locations and their associated pattern types.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1A illustrates a star pattern umbilic. FIG. 1B illustrates a lemon pattern umbilic. FIG. 1C illustrates a monstar pattern umbilic.

FIGS. 6A–6C show respectively, side, bottom and top perspectives of the two surfaces. FIG. 6D is a graph illustrating lines of curvature passing through the umbilics of the two surfaces. FIG. 6E is a graph of the two surfaces with their respective lines of curvature superimposed for comparison. FIG. 6F is a graph showing the principal lines of curvature through each umbilic for the two surfaces.

DETAILED DESCRIPTION OF THE INVENTION

A description of preferred embodiments of the invention follows.

The present invention is based on extraction of intrinsic properties of surfaces. These properties are not affected by coordinate transformations, random noise or malicious action of a user, and are destroyed only if the digital model describing the shape is changed so much that the altered model can no longer be considered to be approximately identical to the original surface.

At any point on a 3D surface, one can compute the directions of minimum and maximum curvature, i.e., the directions of principal curvature. It is well-known that, with some notable exceptions, the two directions of principal curvature are orthogonal at every point on the surface. Thus one is able to construct an orthogonal net of principal curvature lines upon the surface. The orthogonal net of principal curvature lines provides, for any surface, a parametrization-invariant wireframe model.

There are particularly singular points in these curvature line families where the orthogonality of the curvature lines is violated. These umbilical points, or umbilics, are characterized by the condition that at each such point, for all tangent directions, the normal curvature yields the same value.

In particular, there are three specific types of umbilics that are stable, i.e., remain unchanged, under moderate surface deformations. Each of the three stable umbilical point types is associated with a particular local curvature line pattern. The umbilics together with lines of curvature may be treated as intrinsic watermarks defined by a surface's shape.

It is well-known that curvature-continuous solids, which are topologically equivalent to a sphere, must have at least one umbilic which is a singular point of an orthogonal net of lines of curvature. An embodiment of the present invention computes the lines of curvature and umbilics on an original surface A, and checks whether a suspect surface B has the same pattern, even if the suspect surface is modeled differently, for example, with different knot vectors and different control points.

Figure 1A:
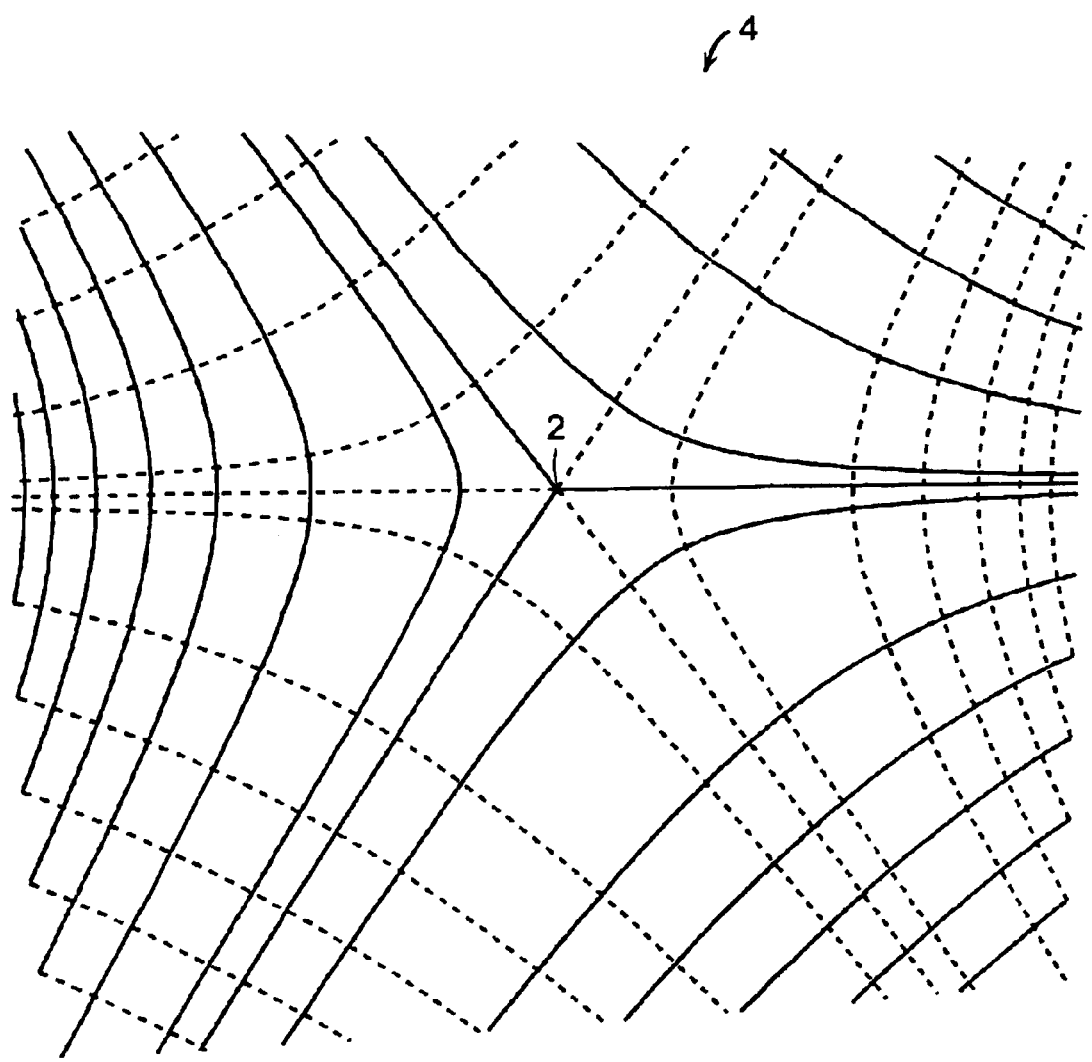
FIGS. 1A–1C are graphs illustrating orthogonal nets of principal lines of curvature for the three types of stable umbilics.
Figure 1B:
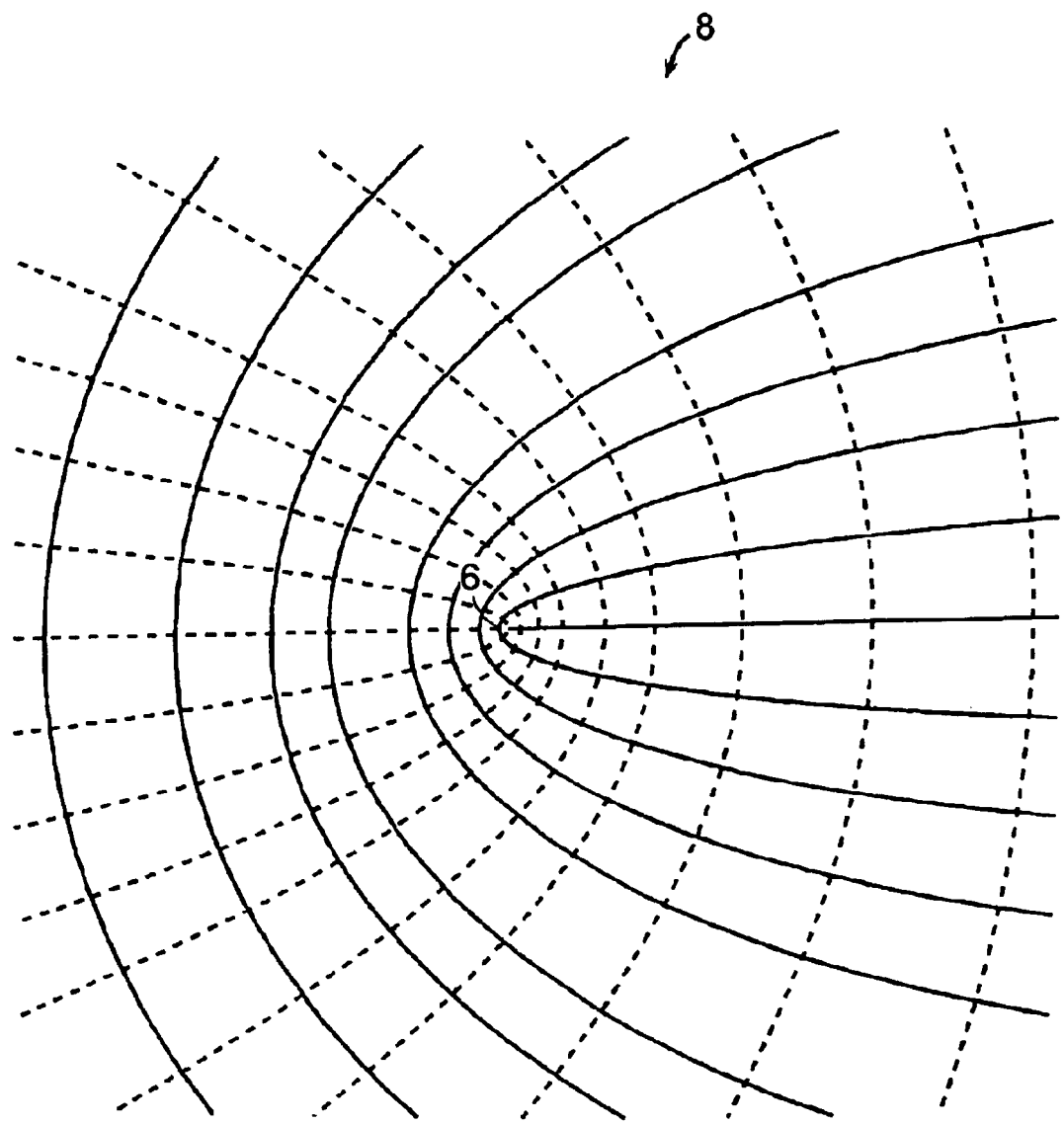
Figure 1C:
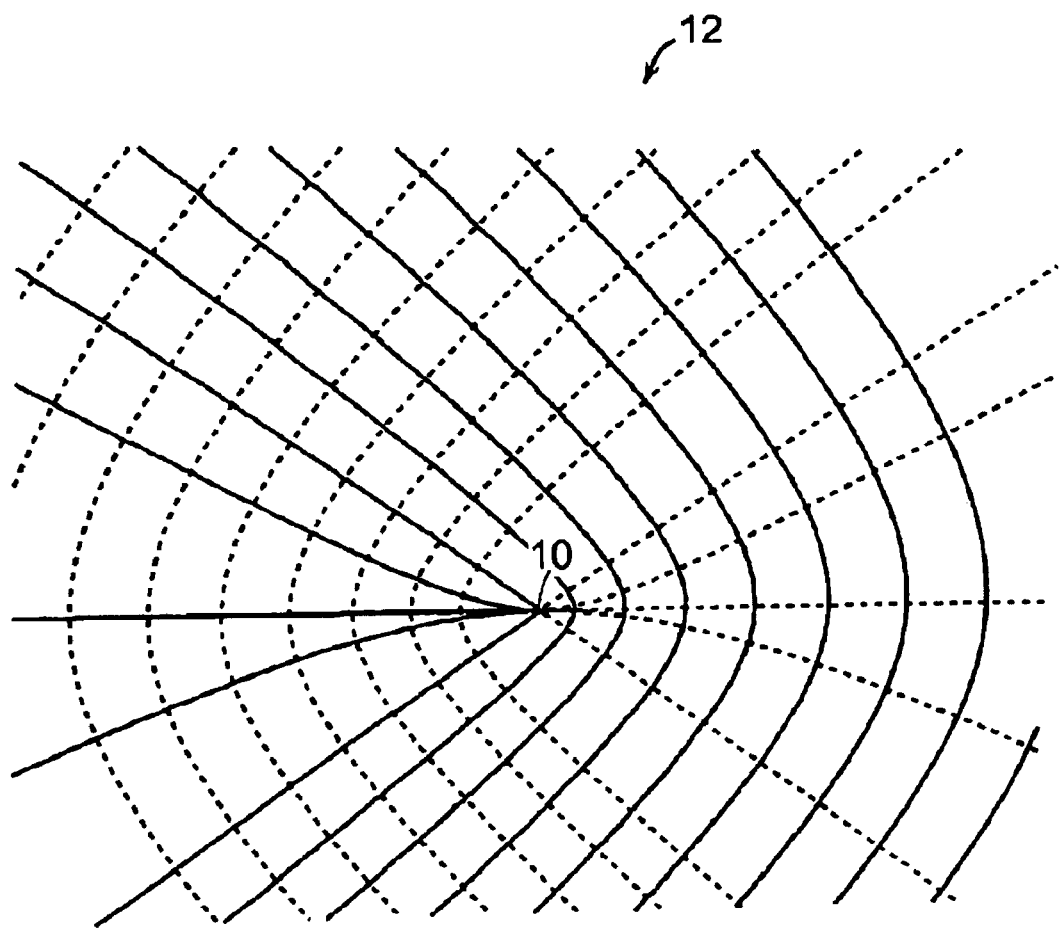

FIGS. 1A–1C illustrate orthogonal nets of principal curvature lines for the three types of stable umbilics. In each of these figures, solid lines represent lines of maximum curvature while dashed lines represent lines of minimum curvature. Note that everywhere, the maximum lines of curvature are perpendicular to minimum lines of curvature, except at the umbilical points or "umbilics".

An umbilic is a point on a surface where all of the normal curvatures are equal. At an umbilic, the surface is approximately part of a sphere (or a plane) and the orthogonal net of lines of curvature becomes singular.

As FIGS. 1A–1C (adapted from [17]) illustrate, there are three generic features of lines of curvature in the vicinity of an umbilic based on the pattern of the net of lines of curvature. The three generic features are called star (FIG. 1A), lemon (FIG. 1B) and monstar (FIG. 1C) based on the pattern. Generic umbilics are stable with respect to small perturbations of the functions representing the surface, and are independent of parametrization and coordinate transformation.

Three lines of curvature pass through the umbilic for monstar and star patterns, while only one line of curvature passes through the umbilic for the lemon pattern. The criterion distinguishing monstar from star is that all three directions of lines of curvature through the umbilic are contained within a right angle, whereas in the star case they are not contained in a right angle.

Except for non-generic cases, there are no other patterns. An example of a nongeneric umbilic is given by the two poles of a convex closed surface of revolution [9].

FIG. 1A illustrates a "star" pattern 4 of principal lines of curvature in the vicinity of a star-type umbilic 2. FIG. 1B illustrates a "lemon" pattern 8 in the vicinity of a lemon-type umbilic 6. Finally, FIG. 1C illustrates a "monstar" (derived from (le)mon and star) pattern 12 in the vicinity of a monstar umbilic 10.

An embodiment of the invention determines whether a suspect surface B is a copy (with few variations) of an original surface A. This may follow a decision made, for example, by a human performing a cursory visual inspection of the two surfaces on a graphics workstation, that surface B might in fact be a minor modification of surface A.

It is therefore assumed that the two surfaces are topologically homeomorphic. For example, when the genus G or number of handles is zero, the solid bounded by the surface is homeomorphic to a sphere; when G=1, a solid is homeomorphic to a torus, and so on.

An umbilic occurs at an elliptic point (convex surface region), while it never occurs at a hyperbolic point (non-convex surface region). Therefore, while not all surfaces possess umbilics, it is difficult to find a surface consisting of all elliptical points that does not have umbilics. It is well-known that curvature continuous solids, which are topologically equivalent to a sphere, must have at least one umbilic.

Figure 2B:
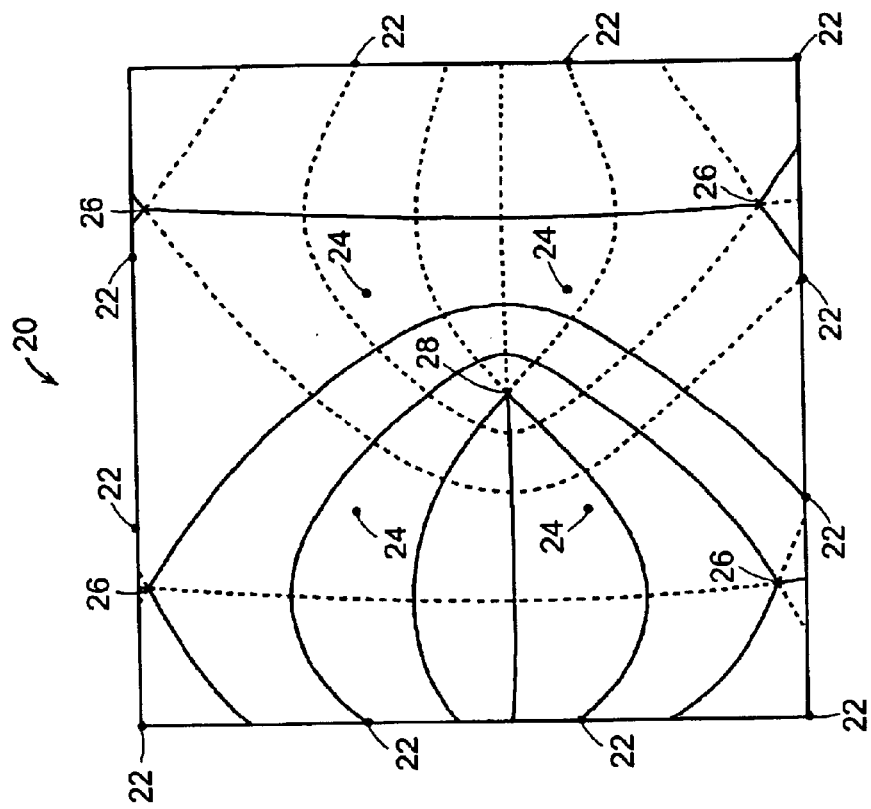
FIG. 2B is a graph illustrating principal lines of curvature and umbilics for the patch of FIG. 2A.
Figure 2A:
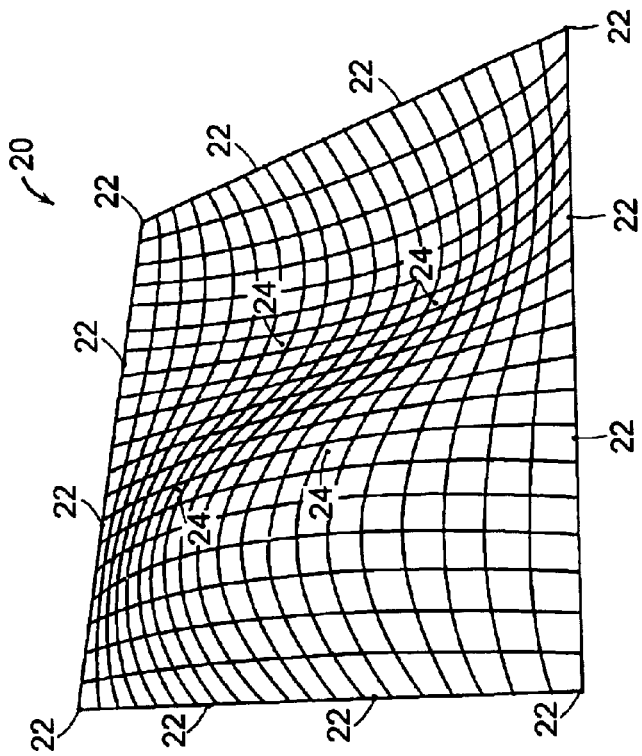
FIG. 2A is a perspective view of a wave-like bicubic integral Bézier patch.

FIG. 2A, adapted from [17], illustrates a perspective view of a surface 20 which is a wave-like bicubic integral Bézier patch whose twelve boundary control points 22 are coplanar such that the boundary curves form a square and the remaining four interior control points 24 are not on the same plane.

As FIG. 2B, also adapted from [17], illustrates that, even for this simple surface patch 20, there are five umbilics: four star pattern umbilics 26 and a monstar pattern umbilic 28 at the center.

Figure 3A:
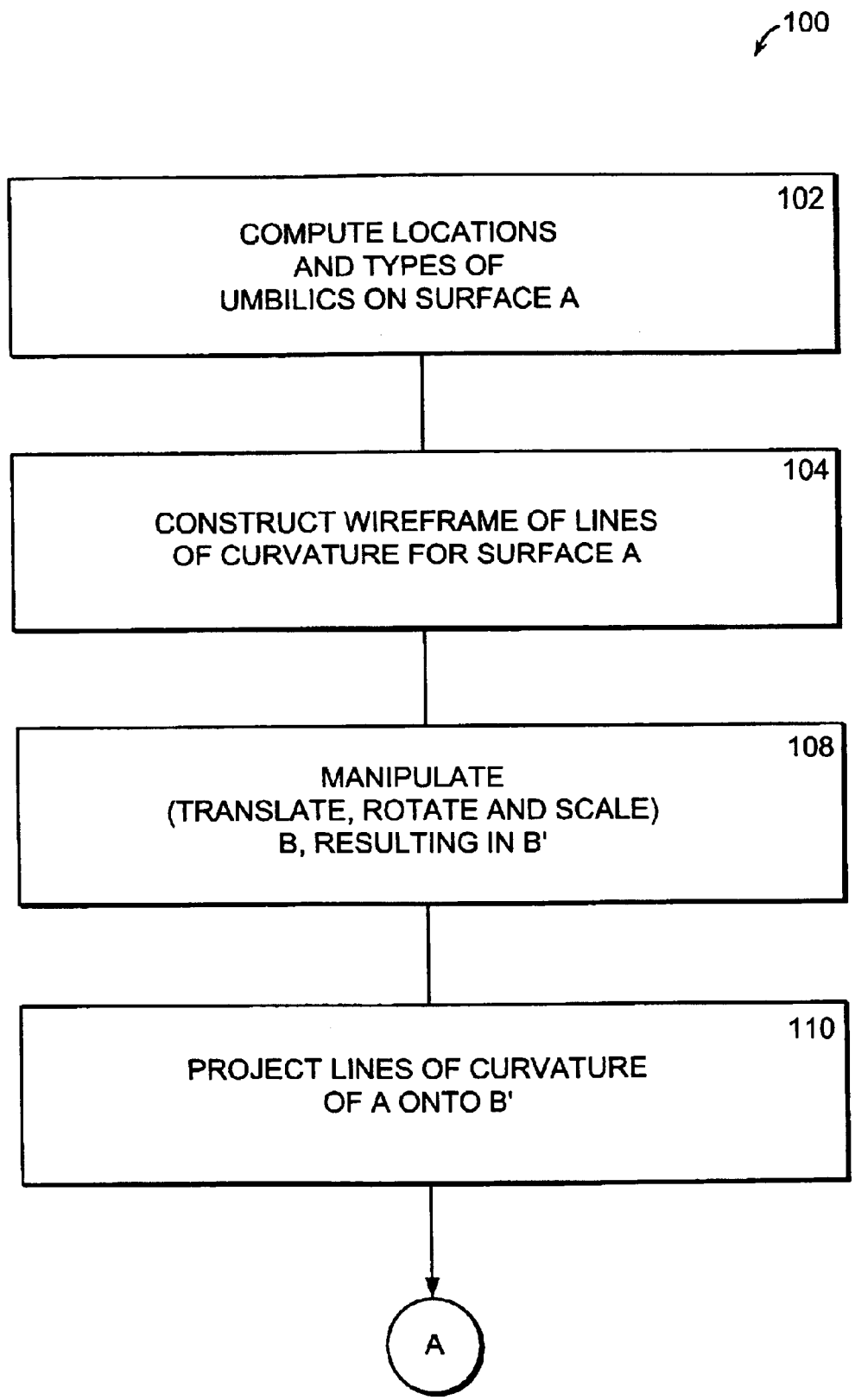
FIGS. 3A, 3B and 3C comprise a flowchart illustrating the basic steps of alternate embodiments of the present invention.
Figure 3B:
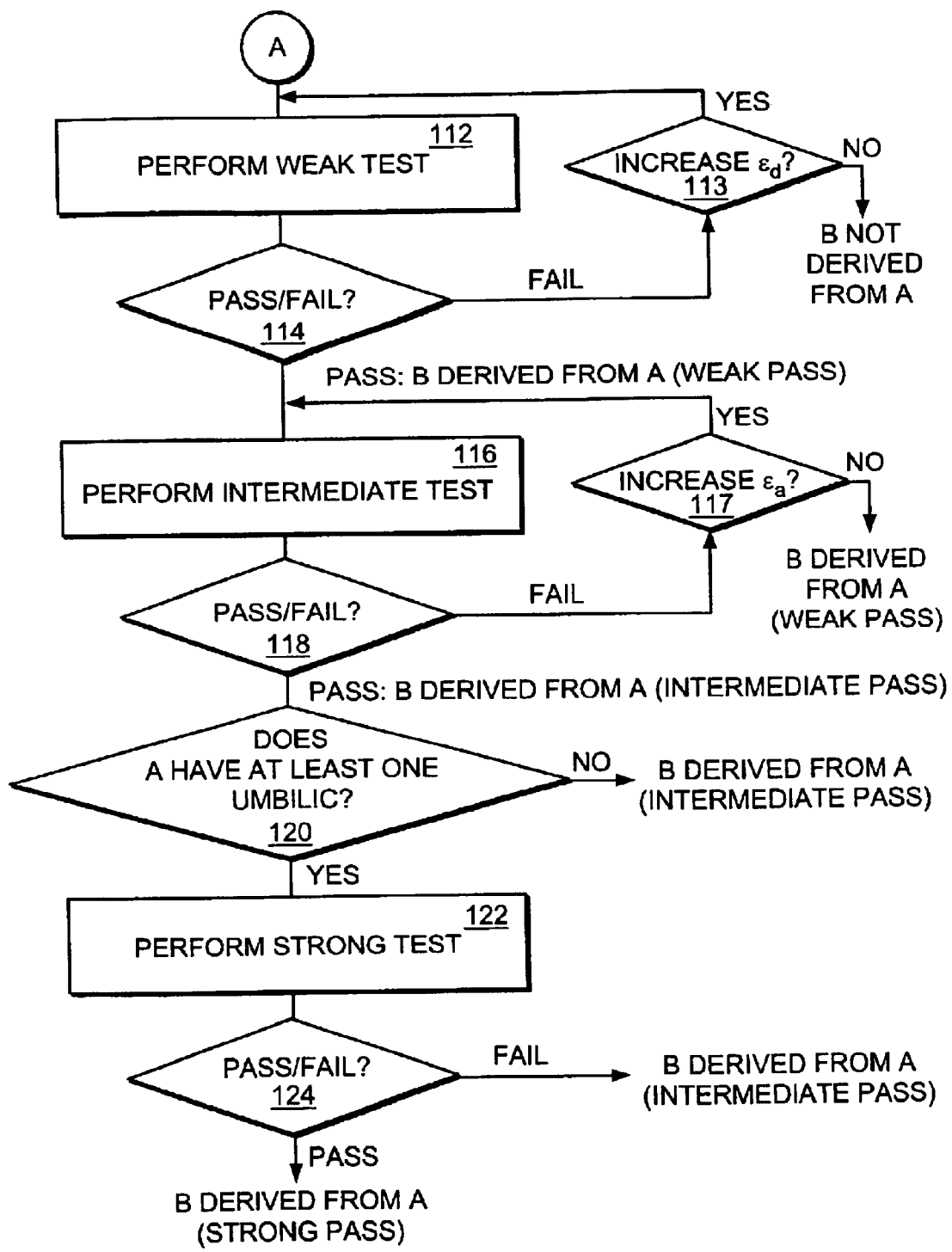
Figure 3C:
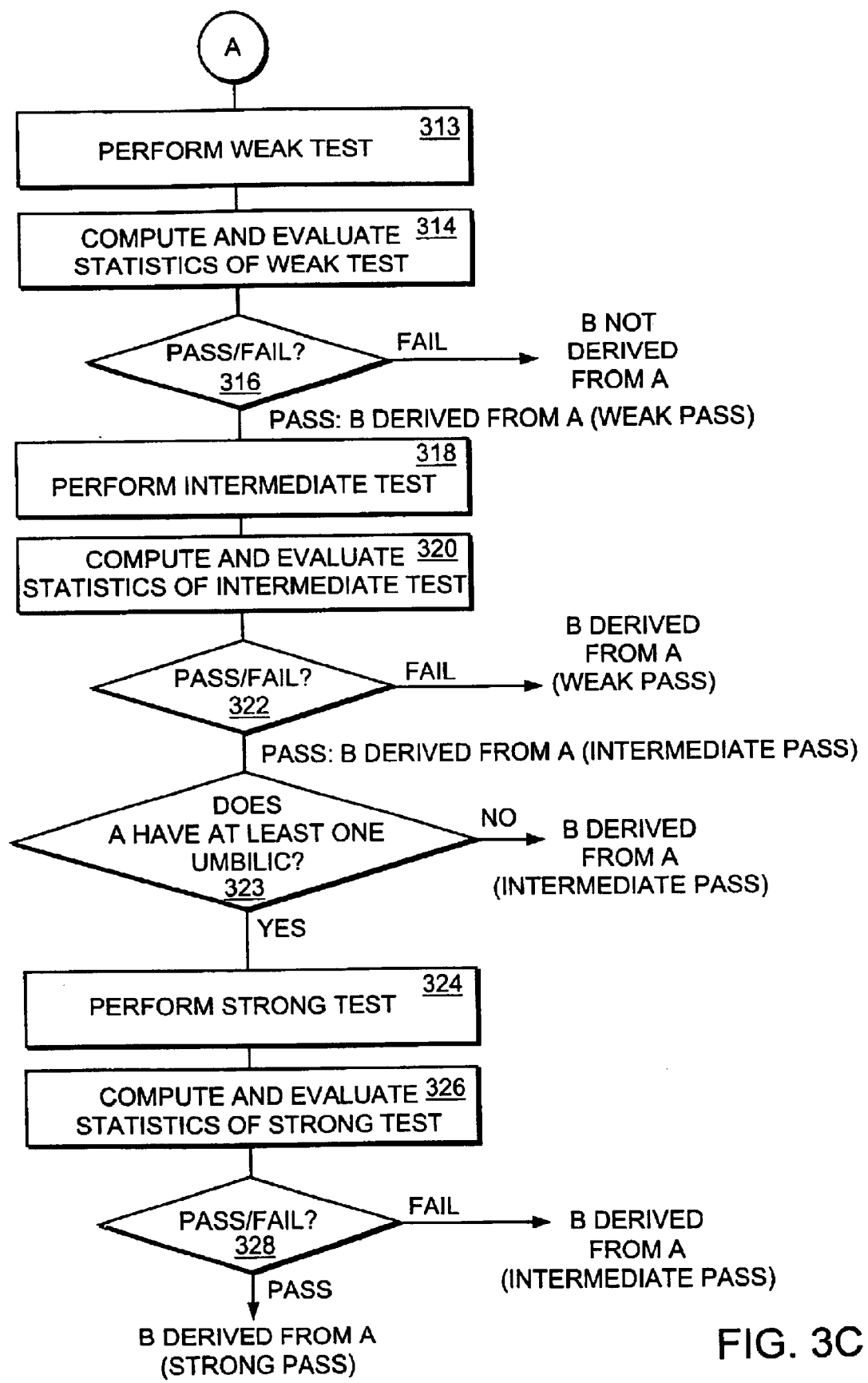

FIG. 3A with either FIG. 3B or FIG. 3C comprises a flow chart 100 illustrating, at a high level, the basic steps of alternate embodiments of the present invention. It would be understood by one skilled in the art that not all of the steps need be executed in the particular order shown.

We assume that various kinds of geometrical operations, such as translation, rotation, uniform scaling, addition of noise to the control points, approximation of the surface with different degree surface and subdivision of the faces, have been imposed on surface B, but the operations do not include geometrical operations such as shearing and nonuniform scaling, which degrade the visual appearance or functionality of the solid.

First, an orthogonal net of lines of curvature on surface A is computed and any umbilics on surface A are detected. In particular, at step 102, the locations of umbilics on original surface A are computed, if any, along with their associated pattern types. At step 104, the wireframe is constructed on surface A from the orthogonal net of principal lines of curvature of surface A.

At step 108, suspect surface B is manipulated through various transformations, such that surface A and manipulated surface B' can be compared efficiently. Such manipulation comprises translation, rotation, and uniform scaling.

Note that alternatively, surface A could be manipulated to match the size, location and orientation of surface B, or further, both surfaces could be manipulated to match another set of size, location and orientation.

At step 110, the lines of curvature previously calculated for surface A in step 104, are projected onto surface B'. In step 112, a "weak" test is performed in which the two surfaces are compared. A "distance" function is constructed between corresponding gridpoints on the orthogonal net of lines of curvature on surfaces A and B', using efficient computational geometry methods. Based on this distance function, it is determined whether surface B' is within or out of tolerance. If the maximum distance between corresponding points on the two surfaces is within a margin of error, i.e., tolerance $\epsilon_d$, then at step 114, surface B' is considered to have passed the weak test and is determined to be a copy of surface A (weak pass).

On the other hand, if the distance is greater than tolerance $\epsilon_d$, the test fails. In such cases at step 113, there are two possible courses of action. If $\epsilon_d$ is not large with respect to the size of object, the user may decide to increase it and continue with step 112. This may be repeated through several iterations. If $\epsilon_d$ is large, then the user may decide to stop the process and decide that B is not derived from A.

If the surfaces pass the weak test in steps 112 and 114, then an intermediate test may be performed at step 116. In the intermediate test, the principal directions of curvature at each corresponding gridpoint or footpoint, are compared. If they are within a certain margin of error, $\epsilon_a$, of each other, then surface B' is considered to have passed the intermediate test at step 118. Otherwise, the test fails. In such cases, at step 117, there are two possible courses of action. If $\epsilon_a$ is not sufficiently large, the user may decide to increase it and continue on to step 116. If $\epsilon_a$ is sufficiently large, then the user may decide to stop the process and decide that B is derived from A with respect only to the weak test (weak pass).

If surface B' passes the intermediate test, then at step 120 a decision is made depending on whether surface A has any umbilics. If surface A does not have any umbilics, testing is complete and the determination is made that surface B is a copy of surface A.

If, on the other hand, surface A has one or more umbilics, then at step 122, the "strong" test is performed, in which umbilics on the two surfaces are compared, along with their associated patterns. If their locations are within a certain margin of error $\epsilon_u$ of each other, and the corresponding types match, then at step 124, it is determined that the test is passed and that surface B is a copy of surface A with respect to the strong test (strong pass).

On the other hand, if the locations of the umbilics are not within a certain margin of error $\epsilon_u$ of each other, or if the pattern types do not match, then a determination is made that surface B is a copy of surface A with respect to the intermediate test (intermediate pass).

FIG. 3C illustrates an alternate embodiment to that of FIG. 3B. At step 313, a weak test is performed in which the two surfaces are compared. A distance function is constructed between corresponding grid points on the orthogonal net of lines of curvature on surfaces A and B', using efficient and robust computational geometry methods. At step 314, based on the computations of step 313, statistics of the distance function between corresponding grid points are computed and evaluated by the user or a computer program. Such statistics may include, for example, maximum, minimum, average, standard deviation and histogram.

At step 316, a determination is made as to whether the statistics of step 314 pass a set of threshold tests. Such a determination may be made, for example, by a user or a computer program. If the tests are negative, we conclude that B is not derived from A. If the tests are positive, we conclude that B is derived from A (weak pass) and we continue on with step 318.

At step 318, an intermediate test is performed, in which the principal directions of curvature at all corresponding grid points or footpoints, are compared. At step 320, based on the computations of step 318, statistics of angle differences of the principal directions between corresponding points are computed and evaluated by the user or a computer program. Such statistics may include, for example, maximum, minimum, average, standard deviation, and histogram.

At step 322, a determination is made as to whether the statistics of step 320 pass a set of threshold tests. Such a determination may be made, for example, by the user or a computer program. If the tests are negative, we conclude that B is derived from A (weak pass). If the tests are positive, we conclude that B is derived from A (intermediate pass).

At step 323, a determination is made as to whether a strong test can be performed, depending on the existence of at least one umbilic on A. If no umbilic exists on A, we conclude that B is derived from A (intermediate pass).

If at least one umbilic exists on A, then at step 324, the strong test is performed, in which umbilics on the two surfaces are compared, along with their associated patterns. At step 326, based on the computations of step 324, statistics of position differences of the locations between corresponding umbilics are computed and evaluated by the user or a computer program. Such statistics may include, for example, maximum, minimum, average, standard deviation, and histogram.

At step 328, a determination is made as to whether the statistics of step 326 pass a set of threshold tests. This determination may be made, for example, by the user or a computer program. If the tests are negative, we conclude that B is derived from A (intermediate pass). If the tests are positive, we conclude that B is derived from A (strong pass).

Detection and Classification of Umbilics (Step 102)

It is well known that generic umbilics are stable to noise and act like fingerprints. We have studied a computational method to locate all isolated umbilics on a parametric polynomial surface and developed a method to classify their patterns on a free-form parametric surface [14, 16, 17].

The governing equations for locating umbilics result in three polynomial equations with two unknowns when the input parametric surfaces are in integral/rational Bézier forms. NURBS patches can be easily decomposed into their integral/rational Bézier components using knot insertion. The system of nonlinear polynomial equations can be solved robustly and accurately by the Interval Projected Polyhedron (IPP) algorithm, developed in [24, 12, 11, 10, 2 15]. Therefore, for each subdivided rational Bézier surface patch (rational polynomial) of A, all isolated umbilics can be located and their patterns classified.

If we assume that each polynomial equation of l variables is of degree m in each variable, and that the system is n-dimensional, then the total asymptotic time per step is on the order of $O(nlm^{l+1})$. The number of steps depends primarily on the accuracy required [24]. The Projected Polyhedron algorithm achieves quadratic convergence in one dimension, while for higher dimensions, it exhibits linear convergence [24]. Once roots have been isolated, via the IPP algorithm, a local quadratically convergent Newton type algorithm may be used to compute the roots to high precision more efficiently.

However, the IPP algorithm is inefficient when the umbilics are not isolated. These cases occur, for example, when the region is locally a plane or a sphere. In such cases, we are able to locate these regions in advance by checking whether the Gaussian and mean curvatures are constant. The process is meant to be non-interactive and the intrinsic characteristics should be computed off-line.

Computation of Orthogonal Net of Lines of Curvature (Step 104)

A curve on a surface whose tangent at each point is in a principal curvature direction of the surface at that point is called a line of curvature [1]. Since at each point there are two principal directions that are orthogonal, umbilical points being the exception, the lines of curvatures form an orthogonal net of lines. Lines of curvature provide a means for describing the variation of principal curvatures across a surface. The lines of curvature are intrinsic to the surface and do not depend on either translation or rotation transformations. or parametrization of the surface.

Assume for the following discussion that surface A consists of piecewise NURBS patches where each patch is curvature continuous, while there is not necessarily curvature continuity between patches.

An orthogonal net of lines of curvature can be constructed which is intrinsic to surface A. The starting points for the integration of lines of curvature could be the extrema of curvature including Gauss, mean and principal curvatures of one of the NURBS patches of solid A, and all umbilics as well as equally distributed points on all the boundary loops of all the faces of the model. This process leads to a wireframe mesh composed of curvature lines which represent the model.

Manipulation of Suspect Surface B (Step 108)

If surfaces A and B are closed, thus forming solids, then their respective centroids (centers of volume) and moments of inertia can be evaluated. Using Gauss's theorem, i.e., the divergence theorem, which relates an integral over a closed surface to the integral over the corresponding enclosed volume, the triple integrals are reduced to double surface integrals [18].

The inertia tensor of each of the two curved solids A and B consists of a 3×3 square matrix whose terms on the main diagonal ($I_{xx}$, $I_{yy}$, $I_{zz}$) are called the moments of inertia and the remaining terms are called products of inertia ($I_{xy}$, $I_{yx}$, $I_{xz}$, $I_{zx}$, $I_{yz}$, $I_{zy}$) [7]. The inertia tensor has an important property in that its components always form a symmetrical matrix, i.e., $I_{xy}=I_{yx}$, $I_{xz}=I_{zx}$, $I_{yz}=I_{zy}$. In most orientations, all nine components of the matrix are non-zero, however there always exists a special orientation such that the non-diagonal components become zero. The directions of the three orthogonal coordinate axes in this orientation are called principal directions. The principal directions can be easily obtained by solving an eigenvalue problem. Computing volumes, centroids and moments of inertia is a principal method available in all solid modeling systems.

Once the centroids and principal directions of both solids are known, A may be rotated around its centroid such that its principal axes match the coordinate axes. Then B may be translated and rotated so that its centroid and orientation match those of A [21]. Finally, B is uniformly scaled, based on the relative volumes of the two solids, resulting in B'. These scaling and localization techniques can be applied to both NURBS and polygonal models, as well as other models.

$\epsilon_d$-Offset Test (Weak Condition Test—Step 112 or Step 313)

Once the two surfaces have been aligned and scaled, the weak test examines how close surface B' is to surface A, in terms of Euclidean distance. In other words, the test checks whether B' is within a certain distance $\epsilon_d$ of A. Where A and B are solids, the test checks whether A is bounded by the exterior and interior offsets of solid A with distance $\epsilon_d$. In this case, the offset to the solid is the locus of points traversed by the center of a ball of radius $\epsilon_d$ when it is rolled over all the points of the surface of the solid.

Reference [26] discusses how to compute stationary points of the squared distance function between two variable points located on two different geometric entities. The entities include points, rational Bézier curves and surface patches. Following this technique, we evaluate the maximum distance between all gridpoints of the orthogonal net of lines of curvature on the boundary of solid A and the entire boundary surface of solid B'.

The algorithm for computing the minimum distance of a given point (on the boundary of solid A) to the boundary surface of solid B' is likely to be very time consuming, if it follows an exhaustive search through all the boundary faces, edges and vertices of solid B'. Therefore, an efficient distance function algorithm has been developed based on spatial subdivision (bucketing) [6], [3] and on the concept of digital distance transform of the buckets [5]. Using convex hull/bounding box properties, each surface, edge and vertex of solid B' can be efficiently placed/confined in one or more buckets from the bucketing system.

After the geometric entities of B' are placed into buckets, 3D digital distance transform is performed on the 3D bucket system to compute for each bucket a value that approximates the distance to the nearest geometric element on solid A. With the help of bucket sorting, efficiency of the computation of minimum distance from A to B' can be significantly improved. After this step we are able to find if deviations of B' with respect to A are within the tolerance. This ϵ-offset test can be applied to, but is not limited to, suspect models whose boundary surface consists of NURBS and polygonal models.

Shape Intrinsic Property Tests (Intermediate (Step 116 or Step 318) and Strong (Step 122 or Step 324) Condition Tests)

In some situations, it may be necessary to investigate beyond the ϵ-offset test, to check the aesthetic surface quality. We have already computed the orthogonal net of principal curvature lines and detected the umbilics. We can orthogonally project each grid point of the orthogonal net of lines of curvature and umbilical points of surface A onto surface B'. We examine the principal directions and existence of umbilics and their patterns for all the corresponding footpoints on B'. Alternatively, the orthogonal projection method for an entire line of curvature from A onto B' can be attempted by expanding upon prior research by Pegna and Wolter [22].

If principal directions (intermediate test) and the location of umbilics and their patterns (strong test) coincide, it is reasonable to conclude that B is a copy of A. This test compares stable umbilics on both surface wireframes.

The terms "solid" and "surface" have been used somewhat interchangeably because the invention can be used to compare any two 3D surfaces or 3D solids, even if they are modeled differently. Note that a solid is formed or defined by a closed surface. Therefore, it is intended that the term "surface" includes both surfaces and solids.

EXAMPLES

Figure 4A:
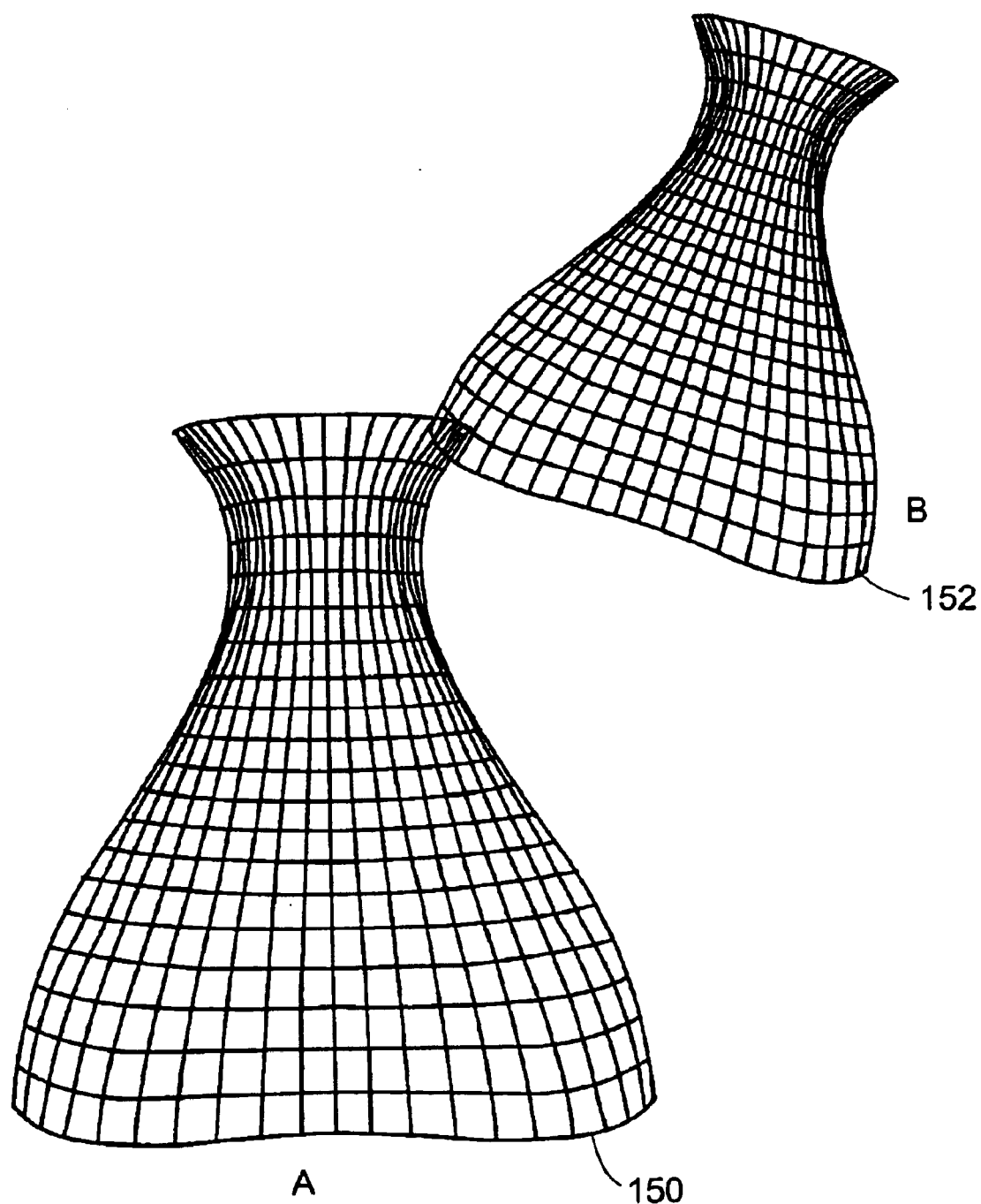
FIG. 4A is a graph of two surfaces to be compared.

FIG. 4A illustrates an example using the present invention to compare two surfaces, A 150 and B 152. The lines drawn in these figures provide a perspective view of each surface 150, 152, and are not indicative of the principal lines of curvature. That is, the wireframes illustrated in these figures are not intrinsic to the surfaces, and may depend on parameterization of the surfaces.

Figure 4B:
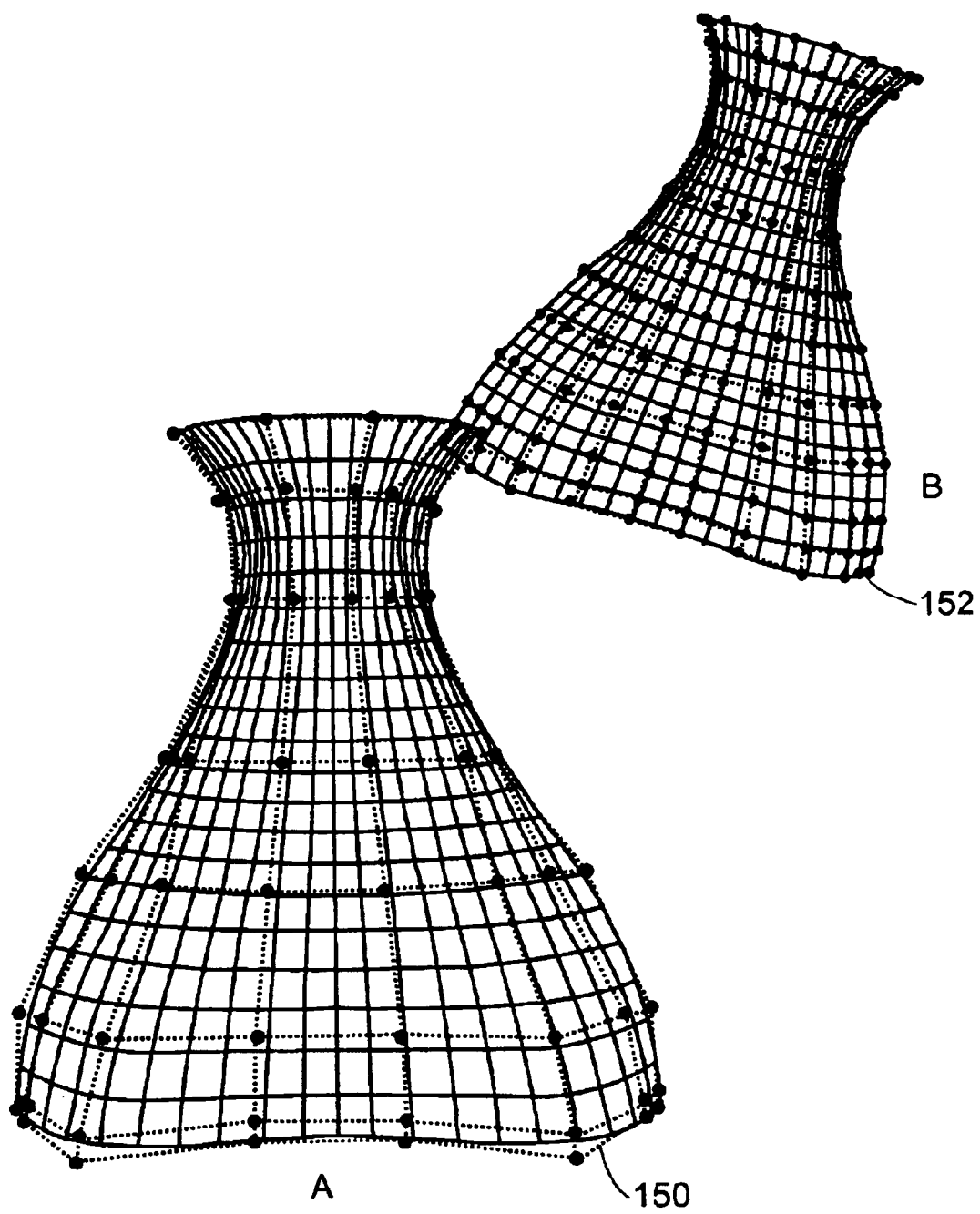
FIG. 4B is a graph of the two surfaces of FIG. 4A with their respective control points.

FIG. 4B illustrates the same surfaces A 150 and B 152 as FIG. 4A, with control points indicated. The control points together with knot vectors define B-spline surfaces. FIG. 4B clearly shows that the same shape can be expressed by different sets of control points. Some methods for watermarking hide information in the control points. This information can be easily lost by using a different set of control points.

Figure 4C:
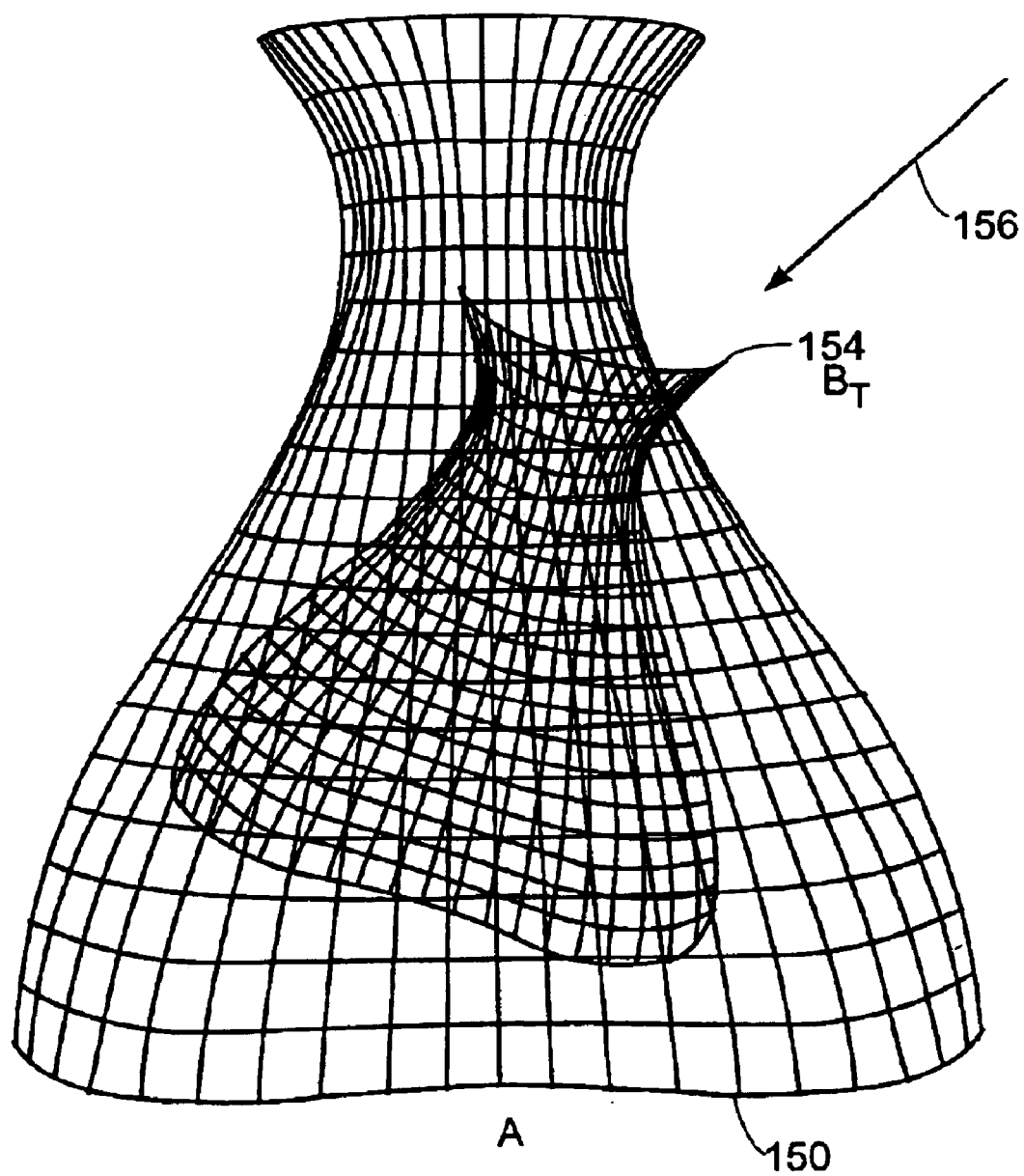
FIG. 4C is a graph of the two surfaces of FIG. 4A after the suspect surface has been translated.
Figure 4D:
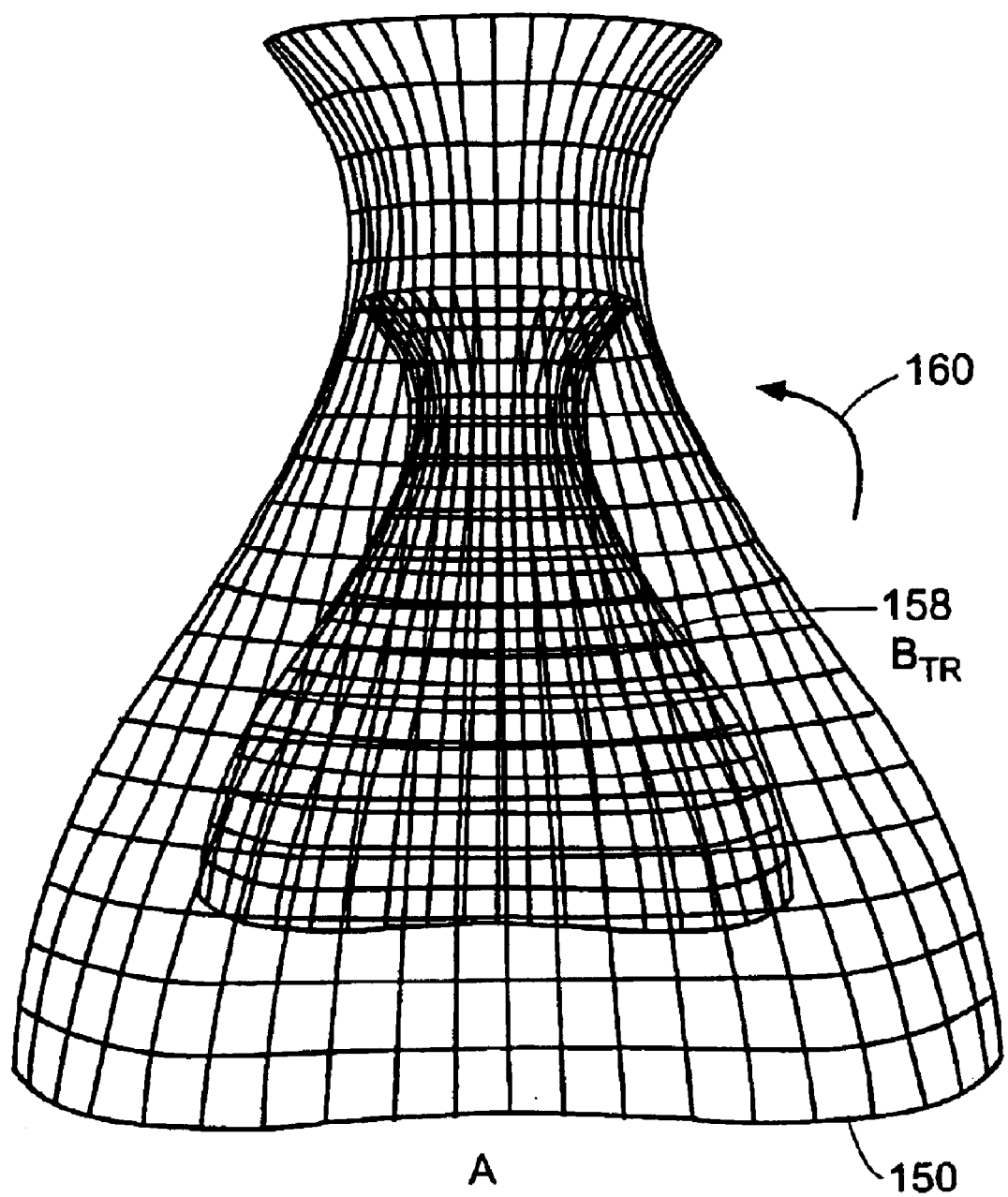
FIG. 4D is a graph of the two surfaces of FIG. 4C after the suspect surface has been rotated.
Figure 4E:
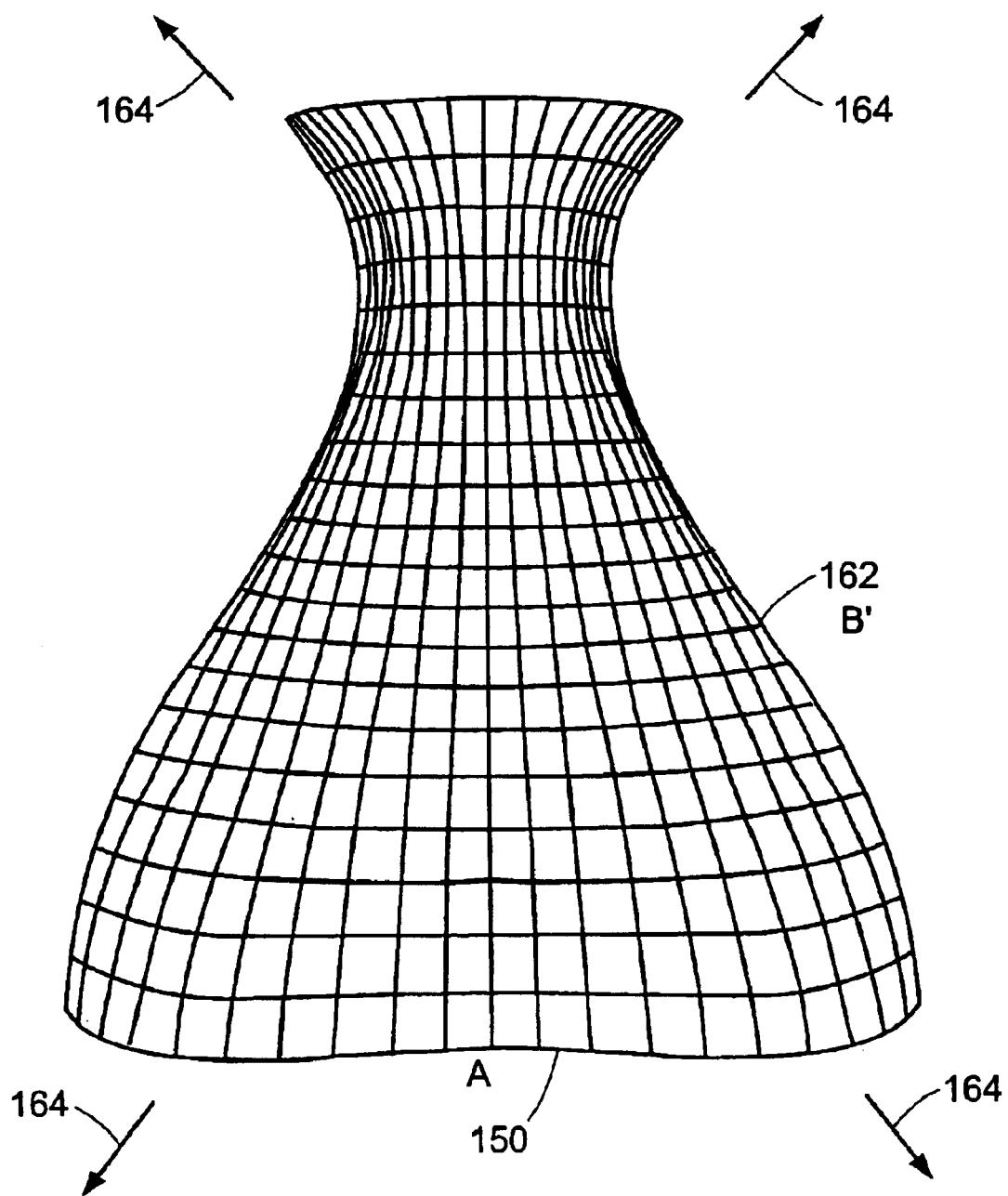
FIG. 4E is a graph of the two surfaces of FIG. 4A after the suspect surface has been uniformly scaled.

FIGS. 4C through 4E illustrate the various transformations performed on surface B in step 108 of FIG. 3A. In FIG. 4C, surface B is translated, as indicated by arrow 156, such that the centroids of surfaces A and B coincide. The translated copy of surface B is designated as $B_T$ 154.

FIG. 4D illustrates the rotation of the suspect surface 158, now designated as $B_{TR}$, according to arrow 160, such that the orientations of A 150 and $B_{TR}$ 158 are aligned.

FIG. 4E illustrates how the target surface is uniformly scaled according to arrows 164, so that surfaces A 150 and the resulting surface B' 162 match as much as possible.

Figure 5A:
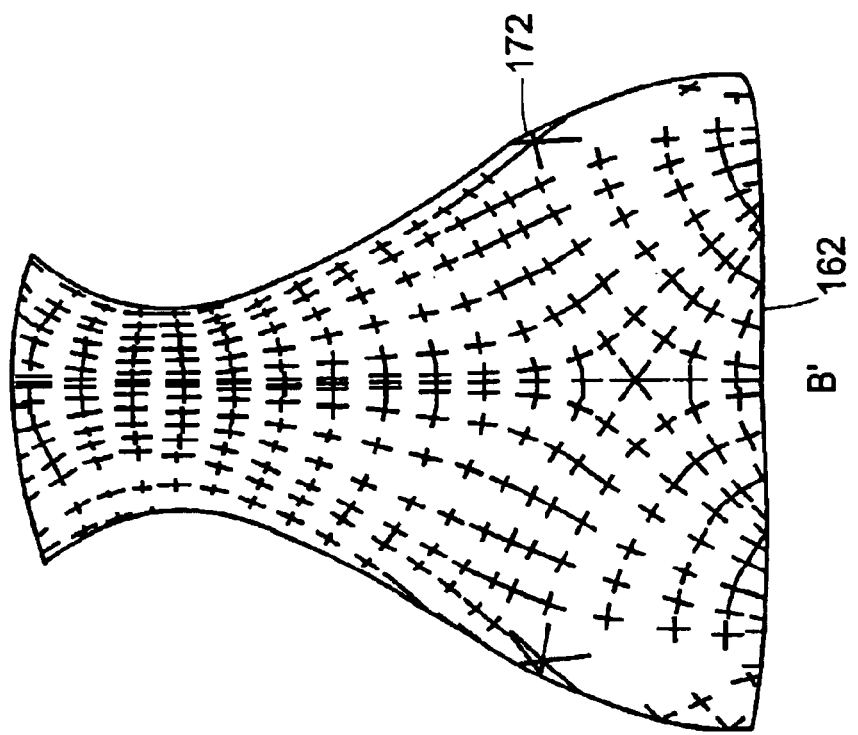
FIG. 5A is a graph comparing, side by side, principal lines of curvature of the two surfaces of FIG. 4E.
Figure 5A:
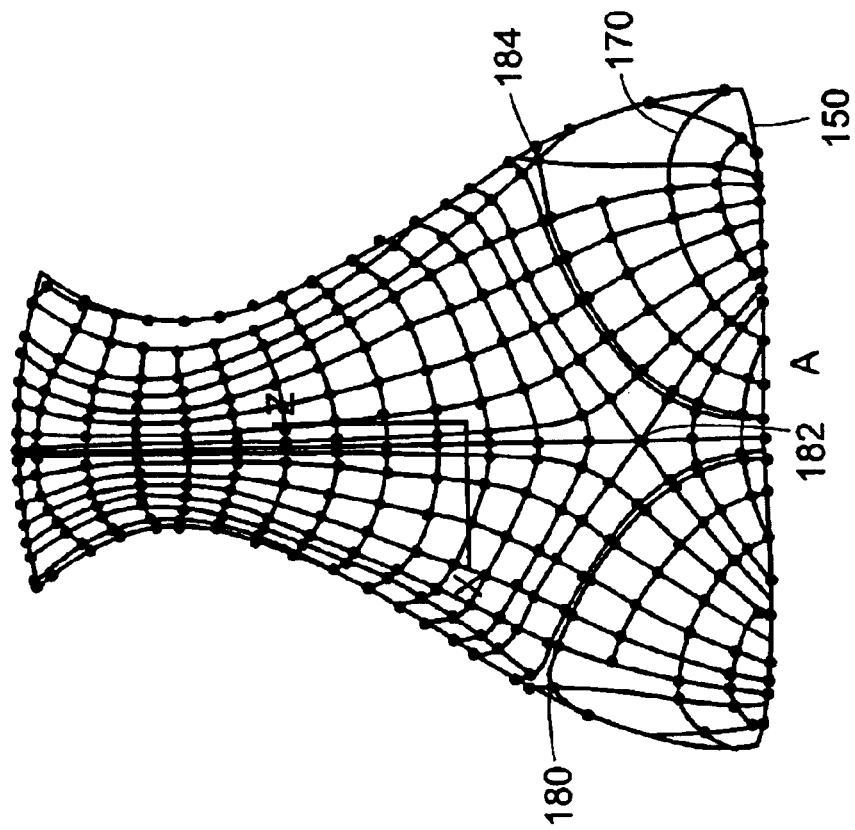

FIG. 5A provides a comparison of A 150 and B' 162. The wireframe 170 comprising lines of curvature of the original surface A 150 is shown. There are three star-type umbilics 180, 182, 184 on surface A 150.

FIG. 5A also illustrates the principal directions on suspect surface B' 162. These principal directions are computed at orthogonally projected points of the grid of points of the wireframe of the original surface A.

Figure 5B:
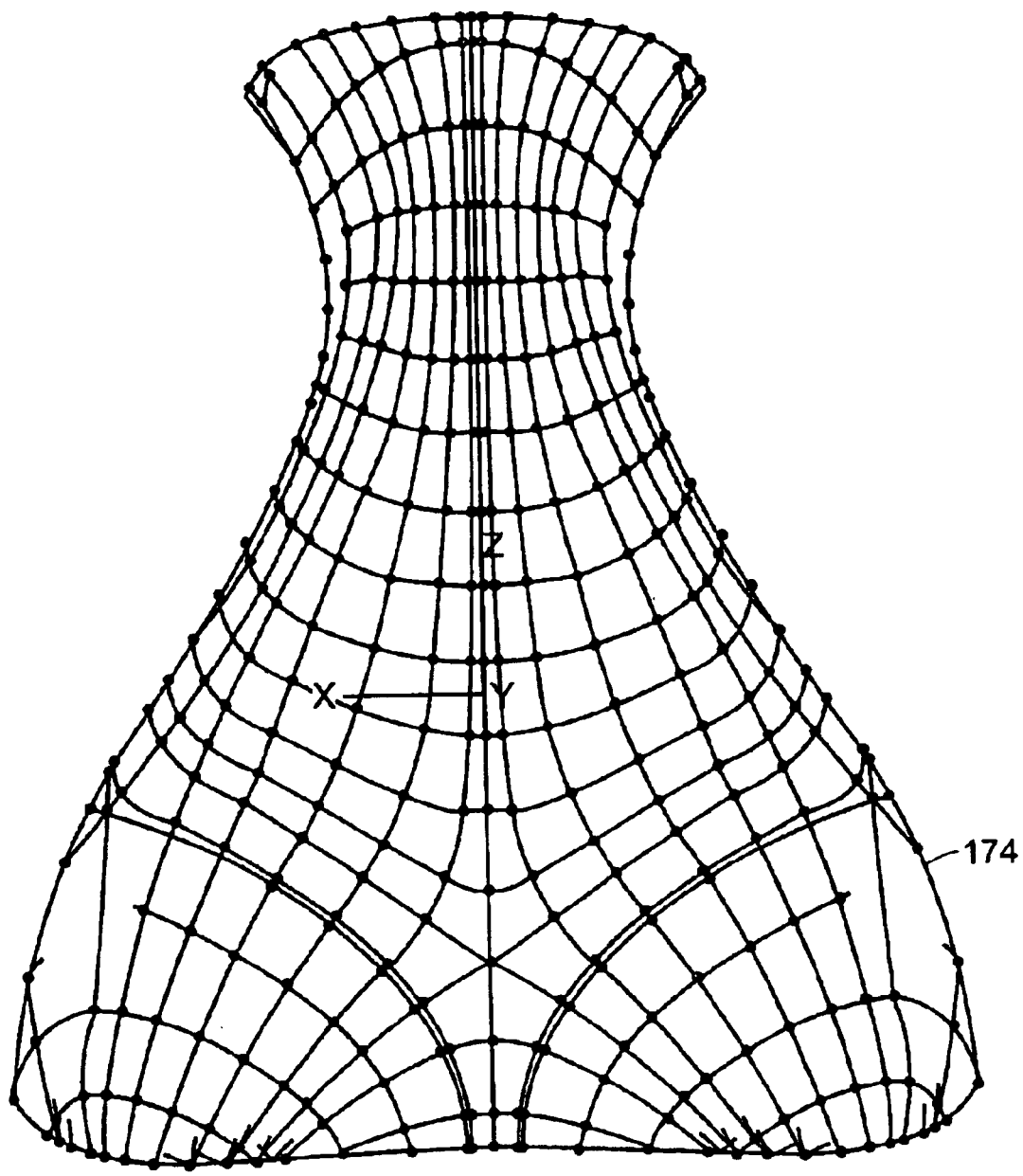
FIG. 5B is a graph in which the two graphs of FIG. 5A have been superimposed.

FIG. 5B illustrates the superimposition of surface B' onto the model of surface A 174.

Figure 5C:
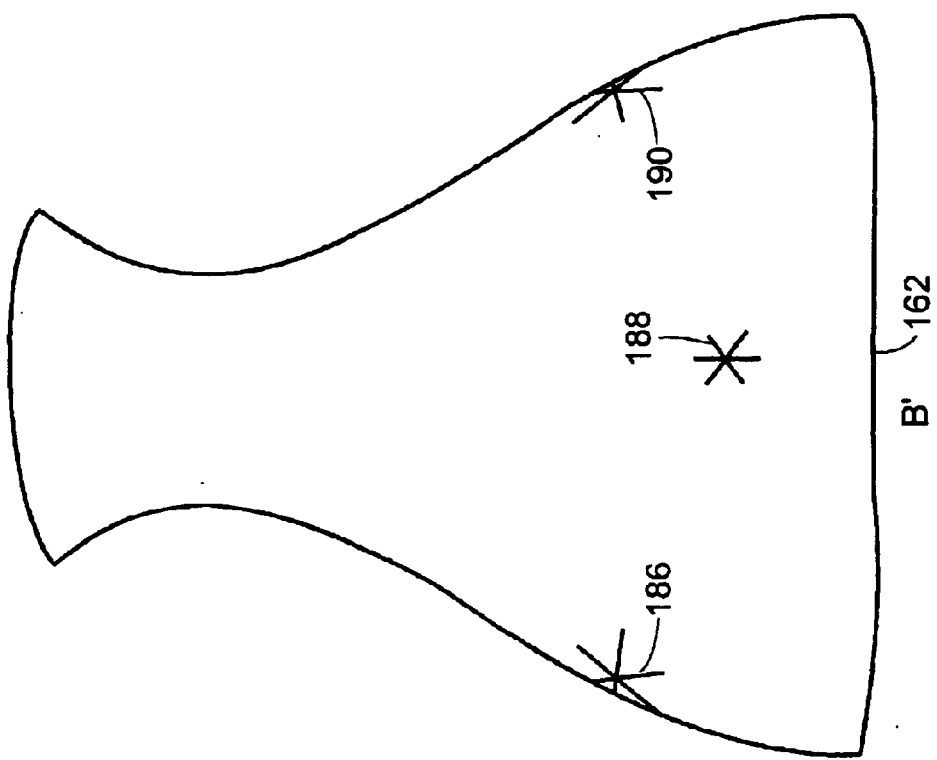
FIG. 5C is a graph illustrating the umbilics of the two surfaces of FIG. 5A.
Figure 5C:
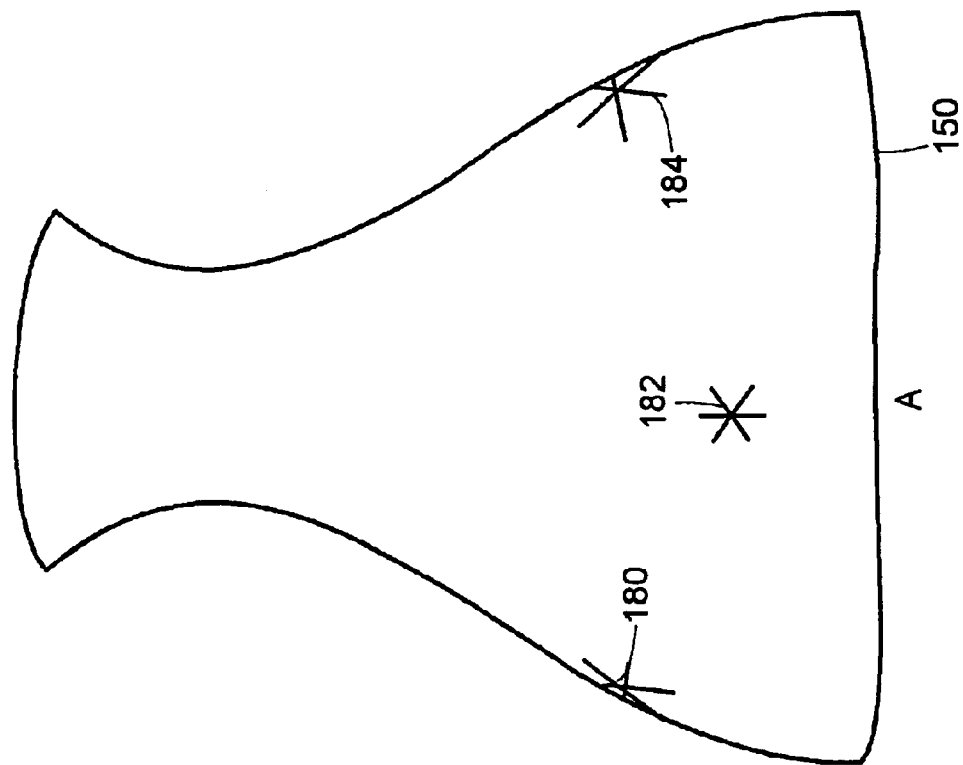

FIG. 5C illustrates the umbilics on the two surfaces 150, 162. Surface A, as described previously, has three umbilics, 180, 182, 184, all of which have associated star patterns. Surface B' 162, and therefore surface B 152 (FIG. 4A) also has three umbilics, 186, 188, 190, which all have associated star patterns. Since the patterns are identical, the locations may be compared, as in step 122 of FIG. 3B. If the corresponding umbilics 180, 182, 184 and 186, 188, 190 from surfaces A 150 and B' 162 respectively are located within the specified margin of each other, then the two surfaces are said to be equivalent, and B' is determined to be a copy of A.

Figure 6A:
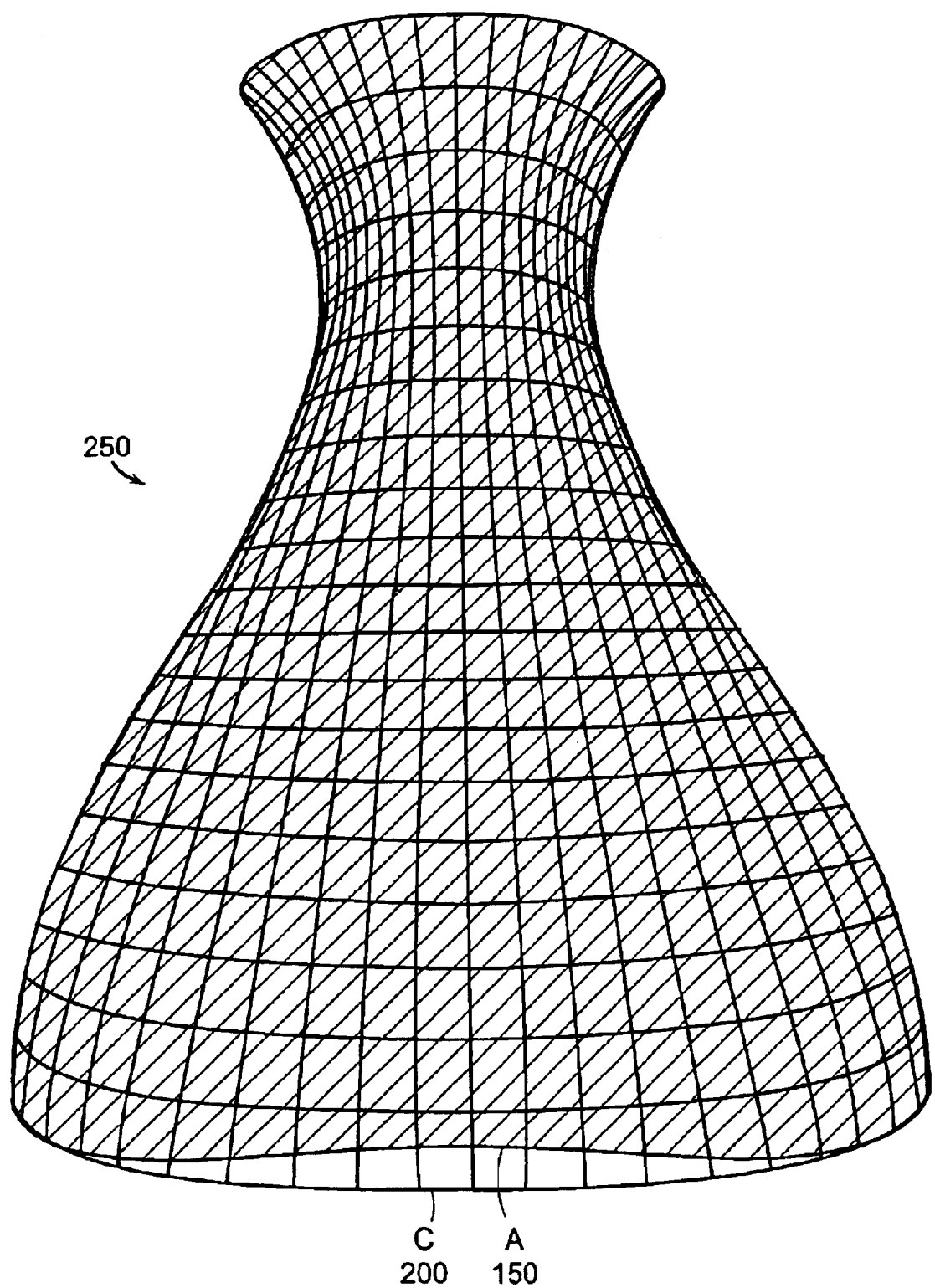
FIGS. 6A–6F are graphs which illustrate two surfaces which differ in their umbilics.
Figure 6B:
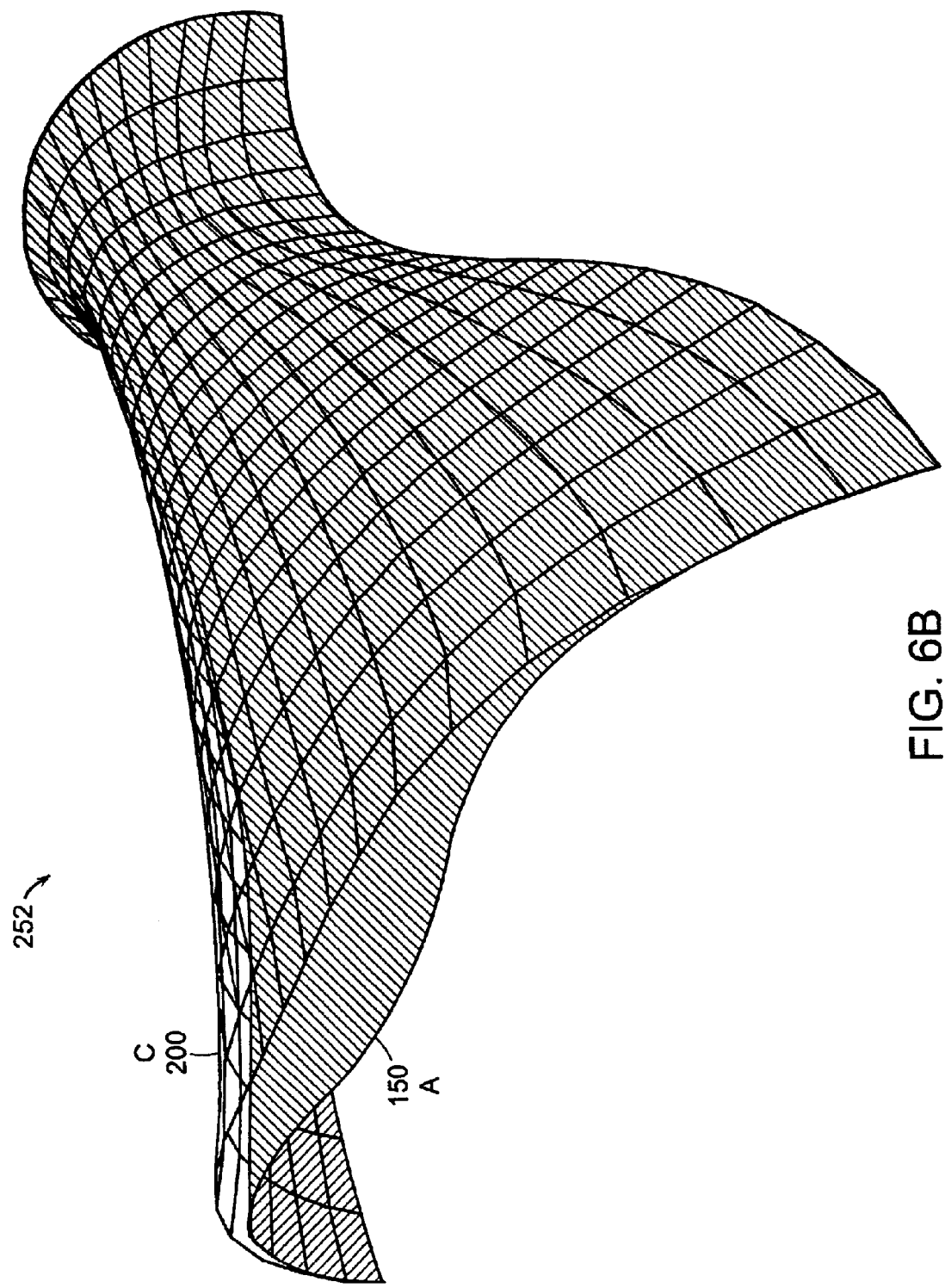
Figure 6C:
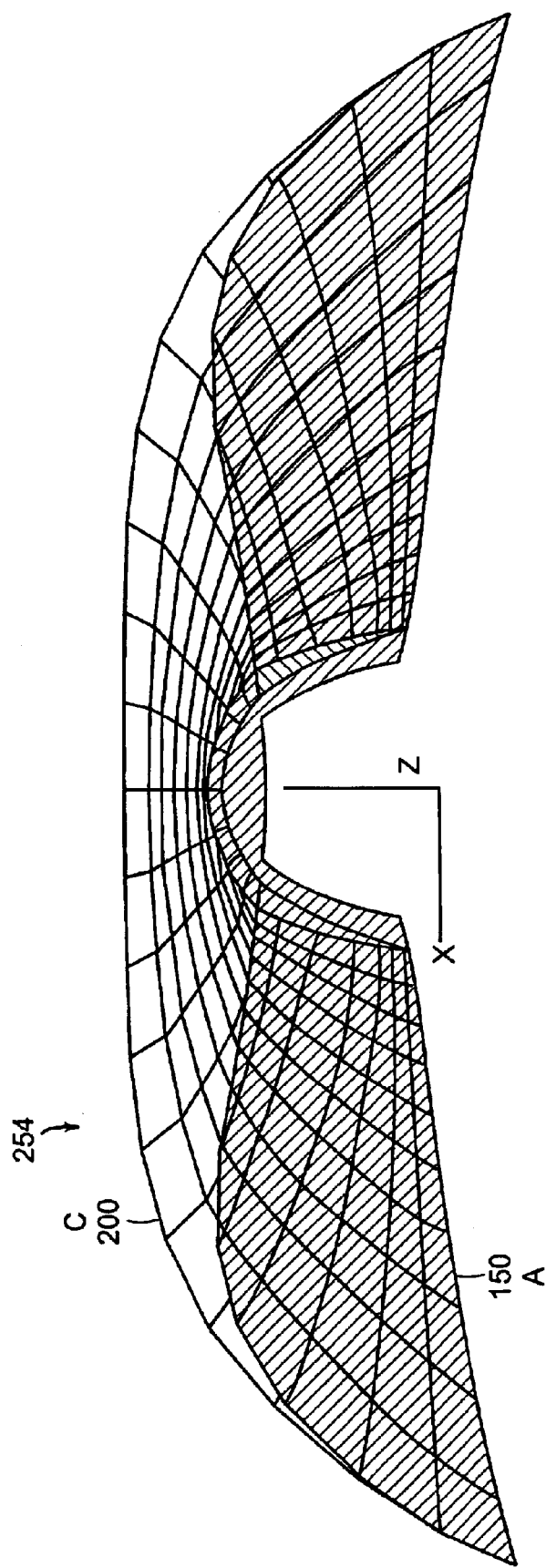

FIGS. 6A through 6F illustrate two surfaces, A 150 and C 200, which differ in their umbilics, so that C is not determined to be a copy A. FIG. 6A illustrates a side view 250 of the two surfaces. Here, the original surface A 150 is depicted in black, while the target surface C 200 is white. FIG. 6B is another perspective view 252 of the same two surfaces A 150 and C 200. FIG. 6C is yet another perspective view 254 looking down from the top at the two surfaces.

Figure 6D:
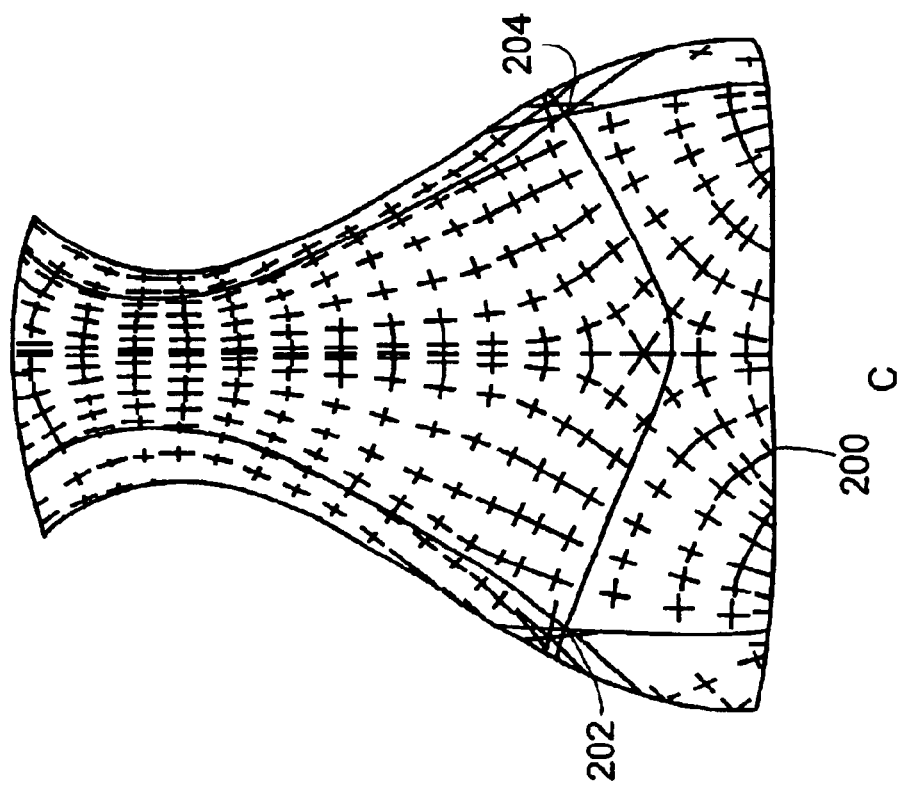
Figure 6D:
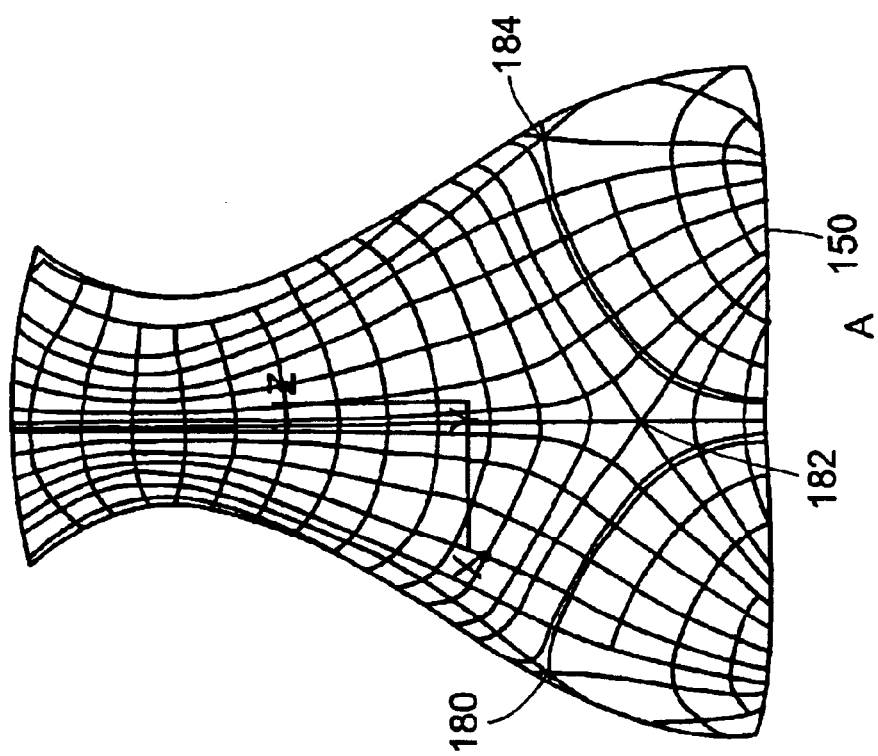

FIG. 6D shows the lines of curvature which pass through the umbilics for the two surfaces. Note that original surface A 150, has three star umbilics 180, 182, 184, while the target surface C 200, has only two umbilics 202, 204. The center umbilic 182 of surface A has disappeared, since the surface of C is significantly different in that area.

Figure 6E:
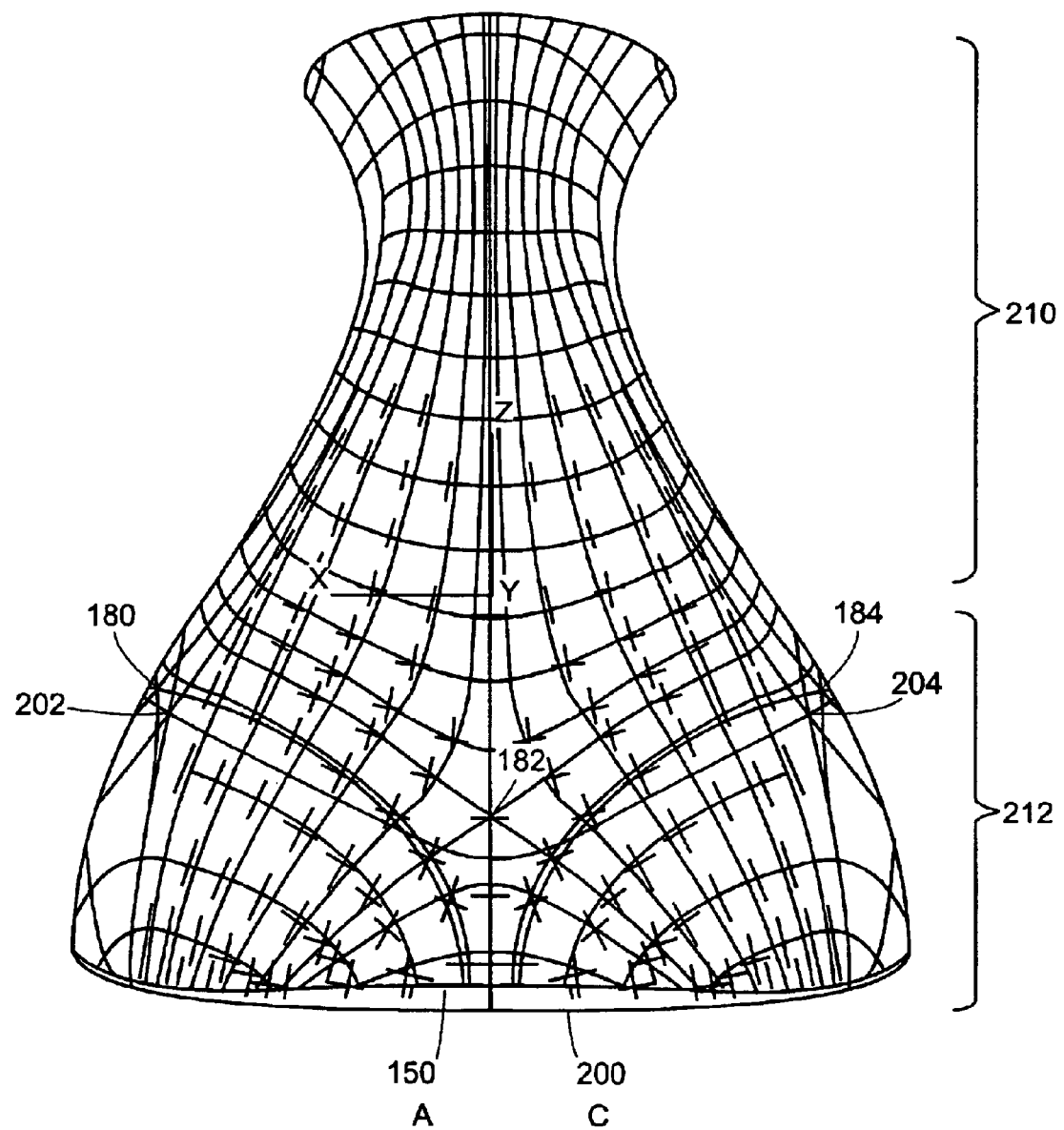

In FIG. 6E, the two images are superimposed. In the upper region 210, a good match can be seen. However, towards the lower region 212, a larger difference can be observed.

Figure 6F:
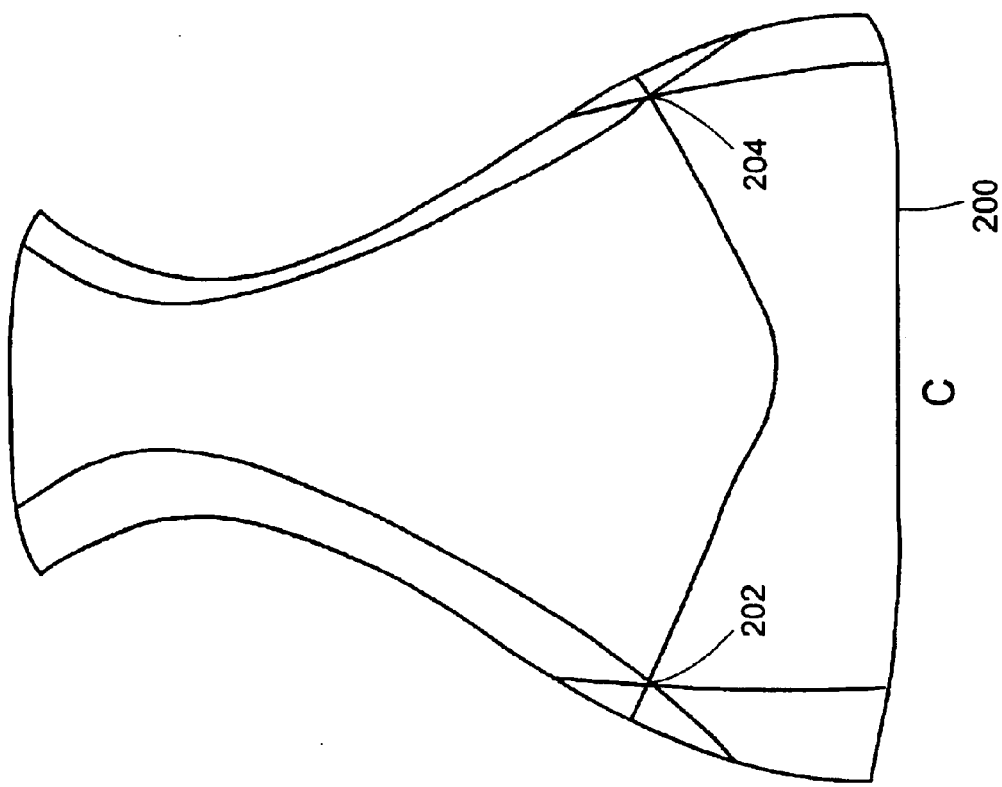
Figure 6F:
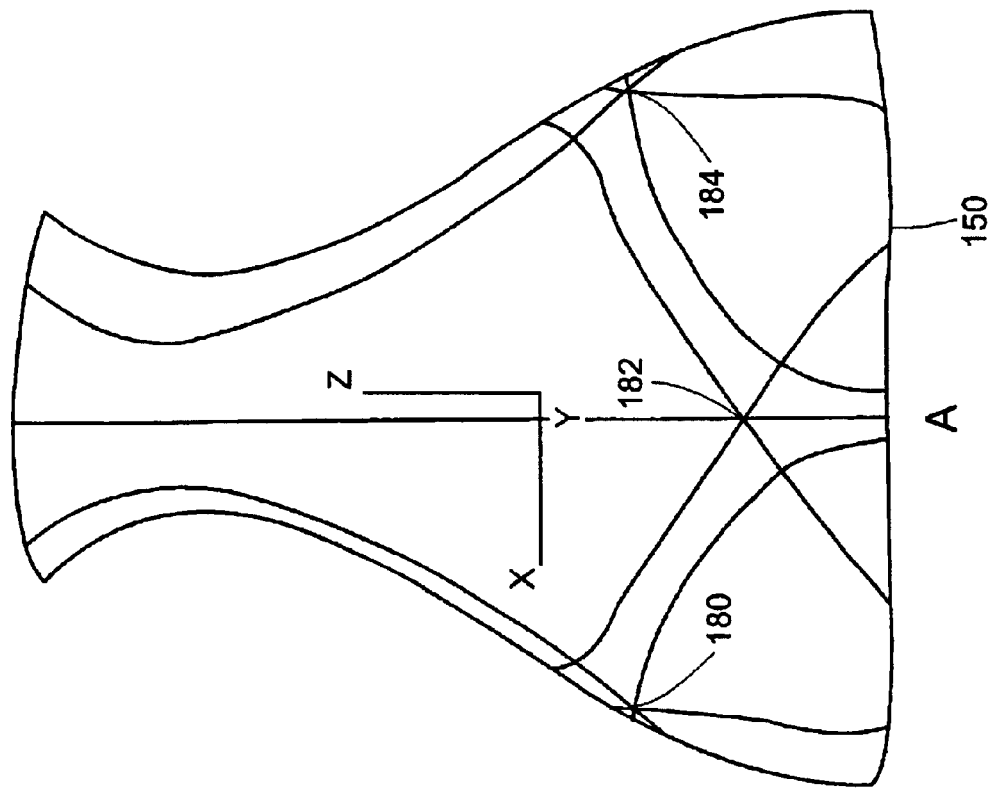

FIG. 6F shows the principal directions of curvature through each umbilic for both original surface A 150 and suspect surface C 200 for comparison.

Commercial Applications

The present invention can help protect ownership of expensive digital data models of an original solid model when it is officially registered with an acknowledged registry or agency. Hence, with the present invention, one would be in the position to settle legal disputes in some cases that may otherwise be beyond the scope of currently available methods and systems.

Another possible commercial application is the use in 3D digital catalogs. Recently, techniques for digital solid shape identification have been in great demand. For example, in electronic commerce through the internet, a 3D digital catalog could allow customers to search for merchandise similar to a specific design. The registered shapes may be indexed according to the locations of their umbilics and the associated pattern types. The techniques of the present invention can be applied in this context as well.

Those of ordinary skill in the art should recognize that methods involved in comparing 3-D surfaces using shape-intrinsic watermarks may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

While this invention has been particularly shown and described with references to preferred embodiments thereof, it will be understood by those skilled in the art that various changes in form and details may be made therein without departing from the scope of the invention encompassed by the appended claims. Note that the terms solid, surface and shape are used somewhat interchangeably in the description.

What is claimed is:

1. A method for determining whether a suspect 3-D surface has been copied from an original 3-D surface, comprising:

performing a weak test, the weak test comprising:
        comparing corresponding points of the two surfaces to check that the corresponding points are located within a specified distance margin of each other;
    comparing umbilics of the two surfaces; and
    determining whether the suspect surface is a copy of the original surface responsive to said steps of comparing.

2. The method of claim 1, wherein the step of comparing umbilics comprises:
    determining whether locations of the umbilics of the suspect surface match within a specified margin umbilics of the original surface.

3. The method of claim 2, wherein the step of comparing umbilics further comprises:
    determining whether pattern types of umbilics of the suspect surface match pattern types of corresponding umbilics of the original surface.

4. The method of claim 1, further comprising:
    manipulating at least one of the surfaces so that characteristics of the two surfaces approximately match.

5. The method of claim 4, wherein the step of manipulating comprises at least one of translating, rotating and scaling.

6. The method of claim 1, the step of comparing umbilics being performed responsive to the weak test.

7. The method of claim 1, further comprising:
    modifying the specified margin; and
    repeating the weak test using the modified margin.

8. The method of claim 1, the weak test generating statistics.

9. The method of claim 8, the step of comparing umbilics being performed responsive to the generated statistics.

10. The method of claim 1, further comprising:
    performing an intermediate test, comprising:
        on each surface, computing the principal directions of lines of curvature at each grid point; and
        comparing the computed directions of lines of curvature for corresponding gridpoints on the surfaces to check that the directions are within a specified angular margin of each other.

11. The method of claim 10, further comprising:
    determining whether the suspect surface is a copy of the original surface responsive to the intermediate test.

12. The method of claim 10, the intermediate test being performed responsive to the weak test.

13. The method of claim 10, the intermediate test being performed responsive to statistics generated by the weak test.

14. The method of claim 10, further comprising:
    modifying the angular margin; and
    repeating the intermediate test using the modified angular margin.

15. The method of claim 10, the intermediate test generating statistics.

16. The method of claim 15, the step of comparing umbilics being performed responsive to the statistics generated by the intermediate test.

17. The method of claim 10, the step of comparing umbilics being performed responsive to the intermediate test.

18. The method of claim 1, wherein the surfaces are closed.

19. The method of claim 1, wherein the surfaces are bordered.

20. The method of claim 1, wherein at least one of the surfaces is represented using parametric modeling.

21. The method of claim 20, wherein parametric modeling is based on non-uniform rational B-splines (NURBS).

22. The method of claim 1, wherein at least one of the surfaces is represented using polygons.

23. The method of claim 1, wherein at least one of the surfaces is represented using implicit modeling.

24. The method of claim 1, further comprising:
    maintaining a registry of 3-D shapes to be used in comparisons with the suspect surface.

25. The method of claim 24, further comprising:
    indexing the maintained shapes according to umbilic locations and their associated pattern types.

26. A method for determining whether a suspect 3-D surface has been copied from an original 3-D surface, comprising:
    performing a test, comprising:
        on each surface, computing the principal directions of lines of curvature at each grid point; and
        comparing the computed directions of lines of curvature for corresponding gridpoints on the surfaces;
    comparing umbilics of the two surfaces; and
    determining whether the suspect surface is a copy of the original surface responsive to said steps of comparing.

27. The method of claim 26, wherein comparing the computed directions of lines of curvature comprises checking that the directions are within a specified angular margin of each other.

28. The method of claim 27, further comprising:
    modifying the angular margin; and
    repeating the intermediate test using the modified angular margin.

29. The method of claim 26, the intermediate test generating statistics.

30. The method of claim 29, the step of comparing umbilics being performed responsive to the statistics generated by the intermediate test.

31. The method of claim 26, further comprising:
    determining whether the suspect surface is a copy of the original surface responsive to the intermediate test.

32. The method of claim 26, the step of comparing umbilics being performed responsive to the intermediate test.

33. A method for determining whether a 3-D surface under examination has been copied from a 3-D surface model, comprising:
    translating, rotating and scaling at least one of the surfaces, position, orientation and size of the surface under examination being approximately those of the model surface;

for each surface, determining a wireframe grid based on lines of curvature;

comparing grid points on the wireframes of the two surfaces; if the grid points are within a specified margin of each other determining umbilies and their associated patterns and comparing between the two surfaces;

if the umbilies between the two surfaces match within a specified margin and their associated patterns are the same, determining that the surface under examination has been copied from the model surface.

34. A method for determining whether a 3-D surface under examination has been copied from a 3-D surface model, comprising:

translating, rotating and scaling at least one of the surfaces, position, orientation and size of the surface under examination being approximately those of the model surface;

for each surface, determining a wireframe grid based on lines of curvature;

comparing grid points on the wireframes of the two surfaces;

if the grid points are within a specified margin of each other determining umbilies and their associated patterns and comparing between the two surfaces;

if the umbilics between the two surfaces match within a specified margin and their associated patterns are the same, determining that the surface under examination has been copied from the model surface.

35. A system for determining whether a suspect 3-D surface has been copied from an original 3-D surface, comprising:

means for manipulating at least one of the surfaces;

means for determining, for each surface, a wireframe grid based on lines of curvature;

means for comparing grid points on the wireframes of the two surfaces;

means for determining umbilics and their associated patterns; and means for comparing locations of the umbilics and for comparing pattern types associated with the umbilics.

36. A computer program product for determining whether a suspect 3-D surface has been copied from an original 3-D surface, the computer program product comprising a computer usable medium having computer readable code thereon, including program code which:

manipulates at least one of the surfaces;

determines, for each surface, a wireframe grid based on lines of curvature;

compares grid points on the wireframes of the two surfaces;

determines umbilics and their associated patterns; and compares locations of the umbilics and pattern types associated with the umbilics.

37. A system for determining whether a suspect 3-D surface has been copied from an original 3-D surface, comprising:

a weak condition tester which compares corresponding points of the two surfaces to check that the corresponding points are located within a specified distance margin of each other;

a comparator which compares locations and associated pattern types of umbilics of the two surfaces; and an analyzer which determines whether the suspect surface is a copy of the original surface responsive to said tester and comparator.

38. The system of claim 37, the comparator determining whether locations of the umbilics of the suspect surface match within a specified margin umbilics of the original surface.

39. The system of claim 38, the comparator further determining weather pattern types of umbilics of the suspect surface match pattern types of corresponding umbilics of the original surface.

40. The system of claim 37, further comprising:

a manipulator which manipulates at least one of the surfaces so that characteristics of the two surfaces approximately match.

41. The system of claim 40, wherein the manipulator performs at least one of translating, rotating and scaling.

42. The system of claim 37, the comparator comparing umbilics responsive to the weak test.

43. The system of claim 37, the weak condition tester repeating its comparison with a modified distance margin.

44. The system of claim 37, the weak condition tester generating statistics.

45. The system of claim 44, the comparator comparing umbilics responsive to the generated statistics.

46. The system of claim 37, further comprising:

an intermediate condition tester, which;

computes, for each surface, the principal directions of lines of curvature at each grid point; and compares the computed directions of lines of curvature for corresponding gridpoints on the surfaces.

47. The system of claim 46, the intermediate condition tester further determining whether the suspect surface is a copy of the original surface responsive to the intermediate test.

48. The system of claim 46, the intermediate condition tester executing responsive to the weak condition tester.

49. The system of claim 46, the intermediate condition tester performing responsive to statistics generated by the weak test.

50. the system of claim 46, the intermediate condition tester repeating the intermediate test using a modified angular margin.

51. The system of claim 46, the intermediate condition tester generating statistics.

52. The system of claim 51, the comparator comparing umbilics responsive to the statistics generated by the intermediate condition tester.

53. The system of claim 46, the comparator comparing umbilics responsive to the intermediate condition tester.

54. The system of claim 37, wherein the surfaces are closed.

55. The system of claim 37, wherein the surfaces are bordered.

56. The system of claim 37, wherein at least one of the surfaces is represented using parametric modeling.

57. The system of claim 56, wherein parametric modeling is based on non-uniform rational B-splines (NURBS).

58. The system of claim 37, wherein at least one of the surfaces is represented using polygons.

59. The system of claim 37, wherein at least one of the surfaces is represented using implicit modeling.

60. The system of claim 37, further comprising:

a registry of 3-D shapes to be used in comparisons with the suspect surface.

61. The system of claim 60, the maintained shapes being indexed according to umbilic locations and their associated pattern types.

62. A system for determining whether a suspect 3-D surface has been copied from an original 3-D surface, comprising:
- a tester, which:
  - computes, for each surface, the principal directions of lines of curvature at each grid point; and
  - compares the computed directions of lines of curvature for corresponding gridpoints on the surfaces;
- a comparator which compares locations and associates pattern types of umbilics of the two surfaces: and
- an analyzer which determines whether the suspect surface is a copy of the original surface responsive to said tester and comparator.

63. The system of claim 62, the intermediate condition tester comparing the computed directions of lines of curvature by checking that the directions are within a specified angular margin of each other.

64. The system of claim 63, the intermediate condition tester
- modifying the angular margin; and
- repeating the intermediate test using the modified angular margin.

65. The system of claim 62, the intermediate condition tester generating statistics.

66. The system of claim 65, the comparator comparing umbilics responsive to the statistics generated by the intermediate condition tester.

67. The system of claim 62, the intermediate condition tester further determining whether the suspect surface is a copy of the original surface.

68. The system of claim 62, the comparator comparing umbilics responsive to the intermediate condition tester.

* * * * *